(12) United States Patent
Boggio

(10) Patent No.: US 10,719,772 B2
(45) Date of Patent: Jul. 21, 2020

(54) UNSUPERVISED MULTIVARIATE RELATIONAL FAULT DETECTION SYSTEM FOR A VEHICLE AND METHOD THEREFOR

(71) Applicant: The Boeing Company, Chicago, IL (US)

(72) Inventor: John M. Boggio, Columbia, IL (US)

(73) Assignee: The Boeing Company, Chicago, IL (US)

( * ) Notice: Subject to any disclaimer, the term of this patent is extended or adjusted under 35 U.S.C. 154(b) by 209 days.

(21) Appl. No.: 15/795,823

(22) Filed: Oct. 27, 2017

(65) Prior Publication Data

US 2019/0130288 A1    May 2, 2019

(51) Int. Cl.
| | |
|---|---|
| B64D 45/00 | (2006.01) |
| G06N 5/04 | (2006.01) |
| G07C 5/08 | (2006.01) |
| G05B 23/02 | (2006.01) |
| G07C 5/00 | (2006.01) |

(52) U.S. Cl.
CPC .............. *G06N 5/04* (2013.01); *B64D 45/00* (2013.01); *G05B 23/0232* (2013.01); *G05B 23/0283* (2013.01); *G07C 5/00* (2013.01); *G07C 5/085* (2013.01); *G07C 5/0808* (2013.01); *G07C 5/0825* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,116,520 | B2 * | 8/2015 | Goupil | G05D 1/0077 |
| 10,089,203 | B2 * | 10/2018 | Mohan | G05B 23/0254 |
| 2009/0216393 | A1 * | 8/2009 | Schimert | G05B 23/0251 |
| | | | | 701/14 |
| 2010/0241293 | A1 * | 9/2010 | Ganguli | G05B 23/0254 |
| | | | | 701/4 |
| 2016/0340059 | A1 * | 11/2016 | Pettre | G05B 23/024 |
| 2017/0106997 | A1 * | 4/2017 | Bekanich | G08B 25/006 |

FOREIGN PATENT DOCUMENTS

GB    2448351    10/2008

OTHER PUBLICATIONS

European Search Report, European Application No. 18196193 dated Mar. 15, 2019.

* cited by examiner

*Primary Examiner* — Masud Ahmed
(74) *Attorney, Agent, or Firm* — Perman & Green LLP

(57) ABSTRACT

A vehicle fault detection system including a plurality of sensors coupled to a vehicle system and configured to detect respective time series of data, where each time series of data corresponds to a component parameter of a plurality of component parameters, a vehicle control module coupled to the plurality of sensors, the vehicle control module being configured to determine an existence of one or more relationships between the plurality of component parameters, and identify anomalies in the respective time series of data based on the one or more relationships between the plurality of component parameters, and a user interface coupled to the vehicle control module, the user interface being configured to present to an operator an indication of the anomalies in the respective time series of data.

20 Claims, 21 Drawing Sheets

| Parameter 1 | Change Type | | | | | | | | | | | |
|---|---|---|---|---|---|---|---|---|---|---|---|---|
| | | ALTITUDE | STATIC AIR TEMPERATURE | LEFT ECONOMY COOLING VALVE | LEFT CONDENSER INLET TEMPERATURE | LEFT SECONDARY HEAT EXCHANGER TEMPERATURE | LEFT FLOW CONTROL VALVE POSITION | LEFT LOW LIMIT VALVE POSITION | RIGHT ECONOMY COOLING VALVE | RIGHT CONDENSER INLET TEMPERATURE | RIGHT SECONDARY HEAT EXCHANGER TEMPERATURE | RIGHT FLOW CONTROL VALVE POSITION | RIGHT LOW LIMIT VALVE POSITION |
| LEFT ECONOMY COOLING VALVE | + | 0% | 0% | | 97% | 0% | 4% | 92% | 61% | 0% | 0% | 0% | 0% |
| STATIC AIR TEMPERATURE | − | 0% | | 0% | 0% | 0% | 0% | 0% | 0% | 0% | 0% | 0% | 0% |
| STATIC AIR TEMPERATURE | + | 0% | | 0% | 0% | 0% | 0% | 0% | 0% | 0% | 0% | 0% | 0% |
| ALTITUDE | − | | 0% | 0% | 0% | 0% | 0% | 0% | 0% | 0% | 0% | 0% | 0% |
| ALTITUDE | + | | 0% | 0% | 0% | 0% | 0% | 0% | 0% | 0% | 0% | 0% | 0% |

| LEFT ECONOMY COOLING VALVE(+)—>LEFT CONDENSER INLET TEMPERATURE | SCORE |
|---|---|
| STRONG CORRELATION BEFORE OR AFTER (NOT BOTH) | 3% |
| SLOPE CHANGE | 97% |
| SIGNIFICANT VALUE CHANGE | 17% |

FIG. 7A

| FIG. 7A | FIG. 7B |
|---|---|

FIG. 7

| PARAMETER 1 | | | | | | | | | | | | | |
|---|---|---|---|---|---|---|---|---|---|---|---|---|---|
| RIGHT LOW LIMIT VALVE POSITION | − | 0% | 0% | 0% | 0% | 0% | 99% | 0% | 96% | 96% | 0% | | |
| RIGHT LOW LIMIT VALVE POSITION | + | 0% | 0% | 0% | 0% | 100% | 0% | 97% | 95% | 0% | 0% | | |
| RIGHT FLOW CONTROL VALVE POSITION | − | 0% | 0% | 0% | 0% | 0% | 0% | 0% | 0% | 0% | | 0% | |
| RIGHT FLOW CONTROL VALVE POSITION | + | 0% | 0% | 0% | 0% | 0% | 0% | 0% | 0% | 0% | | 0% | |
| RIGHT SECONDARY HEAT EXCHANGER TEMPERATURE | − | 0% | 0% | 0% | 0% | 0% | 0% | 0% | 0% | | 0% | 0% | |
| RIGHT SECONDARY HEAT EXCHANGER TEMPERATURE | + | 0% | 0% | 0% | 0% | 0% | 0% | 0% | 0% | | 0% | 0% | |
| RIGHT CONDENSER INLET TEMPERATURE | − | 0% | 0% | 57% | 0% | 0% | 0% | 96% | | 0% | 0% | 97% | |
| RIGHT CONDENSER INLET TEMPERATURE | + | 0% | 0% | 44% | 0% | 0% | 0% | 96% | | 0% | 0% | 95% | |
| RIGHT ECONOMY COOLING VALVE | − | 0% | 0% | 64% | 0% | 0% | 0% | | 99% | 0% | 0% | 99% | |
| RIGHT ECONOMY COOLING VALVE | + | 0% | 0% | 61% | 0% | 0% | 0% | | 96% | 0% | 0% | 97% | |
| LEFT LOW LIMIT VALVE POSITION | − | 0% | 0% | 97% | 93% | 0% | 0% | | 0% | 0% | 0% | 0% | |
| LEFT LOW LIMIT VALVE POSITION | + | 0% | 0% | 96% | 92% | 0% | 0% | | 0% | 0% | 0% | 0% | |
| LEFT FLOW CONTROL VALVE POSITION | − | 0% | 0% | 4% | 0% | 0% | | 0% | 0% | 0% | 100% | 0% | |
| LEFT FLOW CONTROL VALVE POSITION | + | 0% | 0% | 4% | 0% | 0% | | 0% | 0% | 0% | 100% | 0% | |
| LEFT SECONDARY HEAT EXCHANGER TEMPERATURE | − | 0% | 0% | 0% | 0% | | 0% | 0% | 0% | 0% | 0% | 0% | |
| LEFT SECONDARY HEAT EXCHANGER TEMPERATURE | + | 0% | 0% | 0% | 0% | | 0% | 0% | 0% | 0% | 0% | 0% | |
| LEFT CONDENSER INLET TEMPERATURE | − | 0% | 0% | 99% | | 0% | 0% | 97% | 0% | 44% | 0% | 0% | |
| LEFT CONDENSER INLET TEMPERATURE | + | 0% | 0% | 97% | | 0% | 0% | 96% | 0% | 44% | 0% | 0% | |
| LEFT ECONOMY COOLING VALVE | − | 0% | 0% | 98% | | 0% | 4% | 94% | 52% | 0% | 0% | 0% | |

FIG.7B

UNSUPERVISED MULTIVARIATE RELATIONAL FAULT DETECTION SYSTEM FOR A VEHICLE AND METHOD THEREFOR

BACKGROUND

1. Field

The exemplary embodiments generally relate to fault detection and in particular to fault detection using an unsupervised fault detection system that incorporates domain knowledge of one or more vehicle systems by identifying relationships among component parameters.

2. Brief Description of Related Developments

Generally, fault detection in vehicles such as aircraft is performed using some form of statistical analysis. Generally digital sensor data is obtained in a time series of sensor data and is converted into a mathematical form for statistical (or other) processing using, for example, machine learning based solutions. These machine learning based solutions extract statistical measures, known as features, from a dataset, such as the time series of sensor data. Examples of the features include a minimum, a maximum, or an average parameter value over the course of an entire vehicle excursion (which in the case of an aircraft is an entire flight). Values for the features are compared across a series of vehicle excursions in an attempt to identify a trend in the time series of sensor data that precedes a vehicle component fault.

SUMMARY

Accordingly, apparatuses and methods, intended to address at least one or more of the above-identified concerns, would find utility.

The following is a non-exhaustive list of examples, which may or may not be claimed, of the subject matter according to the present disclosure.

One example of the subject matter according to the present disclosure relates to a vehicle fault detection system comprising: a first sensor coupled to a vehicle system and configured to detect a first time series of data of a first component parameter; a second sensor coupled to the vehicle system and configured to detect a second time series of data of a second component parameter; a vehicle control module coupled to the first sensor and the second sensor, the vehicle control module being configured to determine an existence of a relationship between the first component parameter and the second component parameter, and identify anomalies in the one or more of the first time series of data and the second time series of data based on the relationship between the first component parameter and the second component parameter; and a user interface coupled to the vehicle control module, the user interface being configured to present to an operator an indication of the anomalies in the one or more of the first time series of data and the second time series of data.

Another example of the subject matter according to the present disclosure relates to a vehicle fault detection system comprising: a plurality of sensors coupled to a vehicle system and configured to detect respective time series of data, each time series of data corresponding to a component parameter of a plurality of component parameters; a vehicle control module coupled to the plurality of sensors, the vehicle control module being configured to determine an existence of one or more relationships between the plurality of component parameters, and identify anomalies in the respective time series of data based on the one or more relationships between the plurality of component parameters; and a user interface coupled to the vehicle control module, the user interface being configured to present to an operator an indication of the anomalies in the respective time series of data.

Still another example of the subject matter according to the present disclosure relates to a method for vehicle fault detection, the method comprising: detecting, with a plurality of sensors coupled to a vehicle system, respective time series of data, each time series of data corresponding to a component parameter of a plurality of component parameters; determining, with a vehicle control module coupled to the plurality of sensors, an existence of one or more relationships between the plurality of component parameters; identifying, with the vehicle control module, anomalies in the respective time series of data based on the one or more relationships between the plurality of component parameters; and presenting to an operator, with a user interface coupled to the vehicle control module, an indication of the anomalies in the respective time series of data.

BRIEF DESCRIPTION OF THE DRAWINGS

Figure 1:
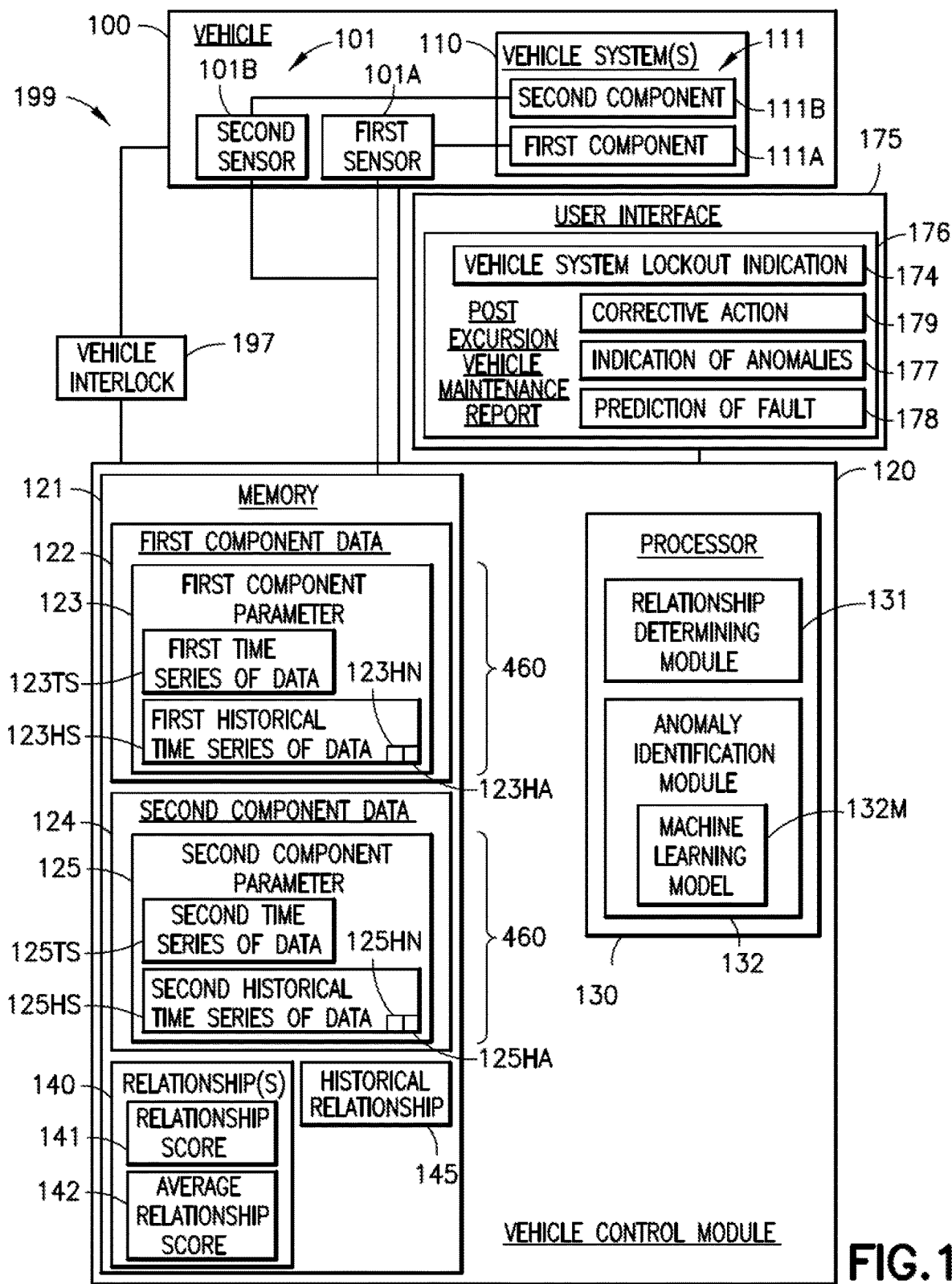
Figure 2A:
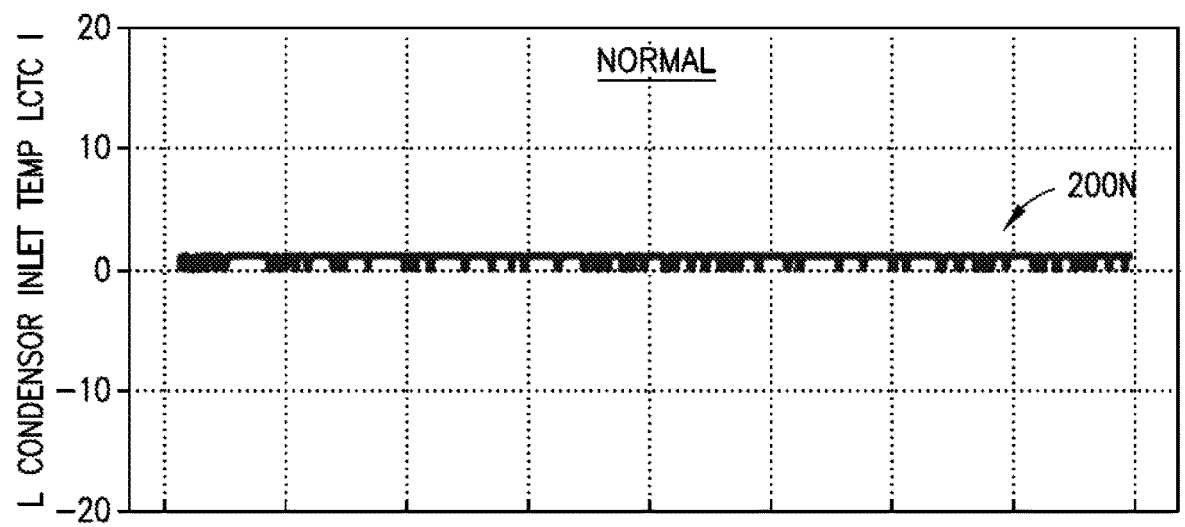
Figure 2B:
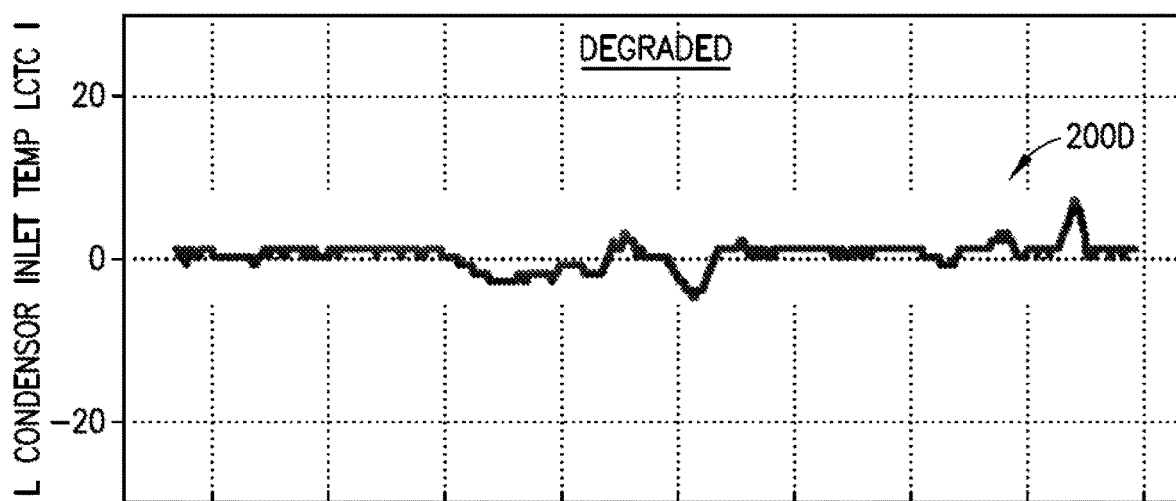
Figure 2C:
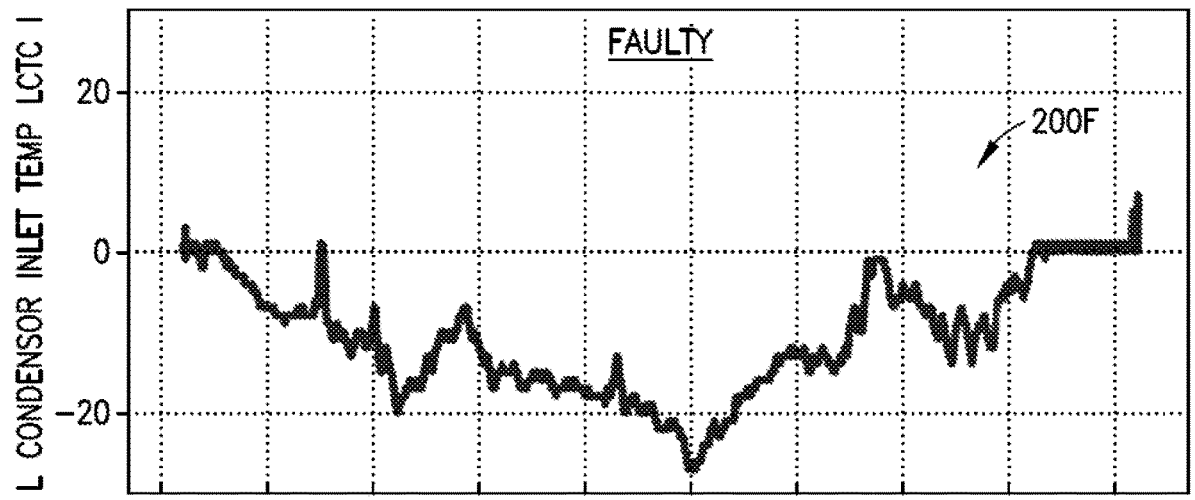
Figure 3A:
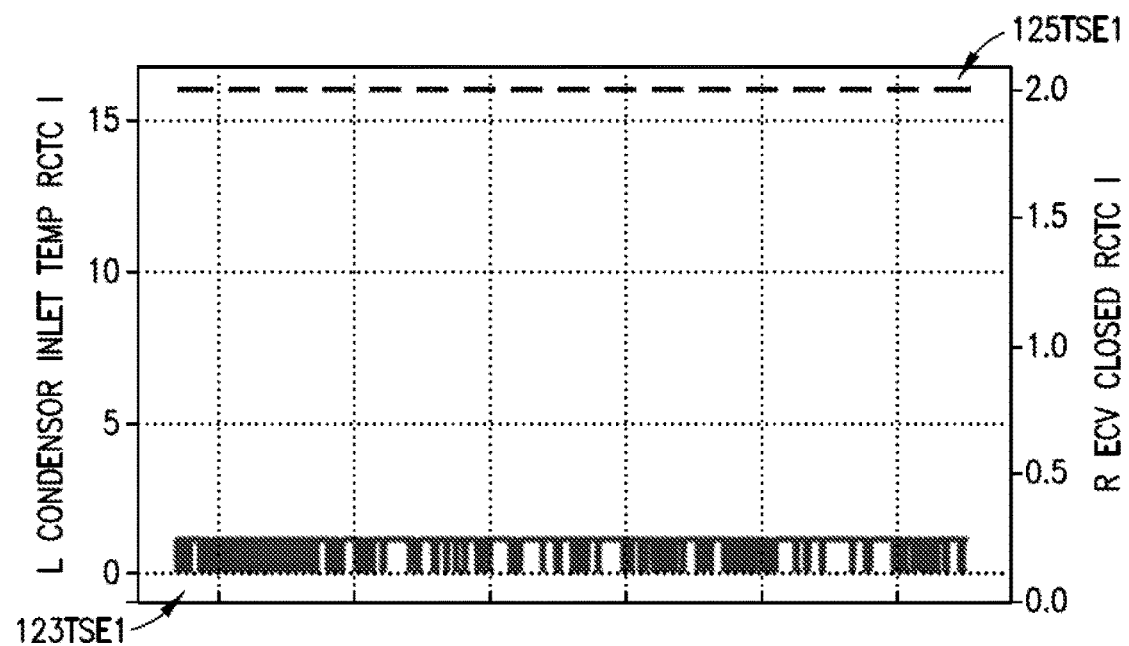
Figure 3B:
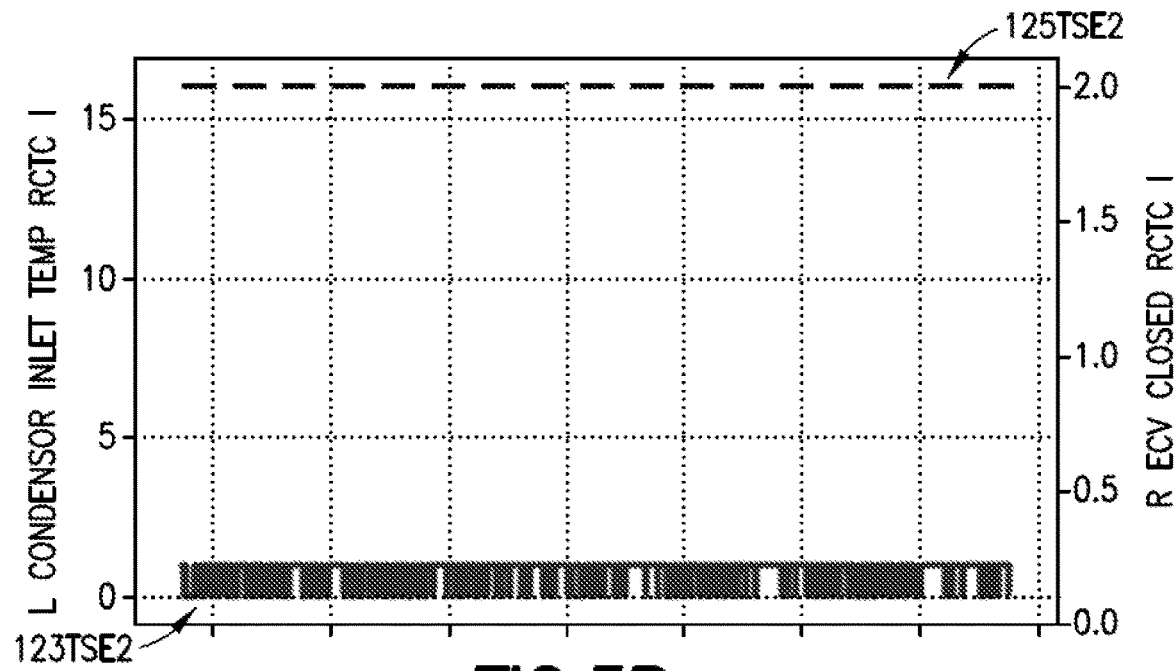
Figure 3C:
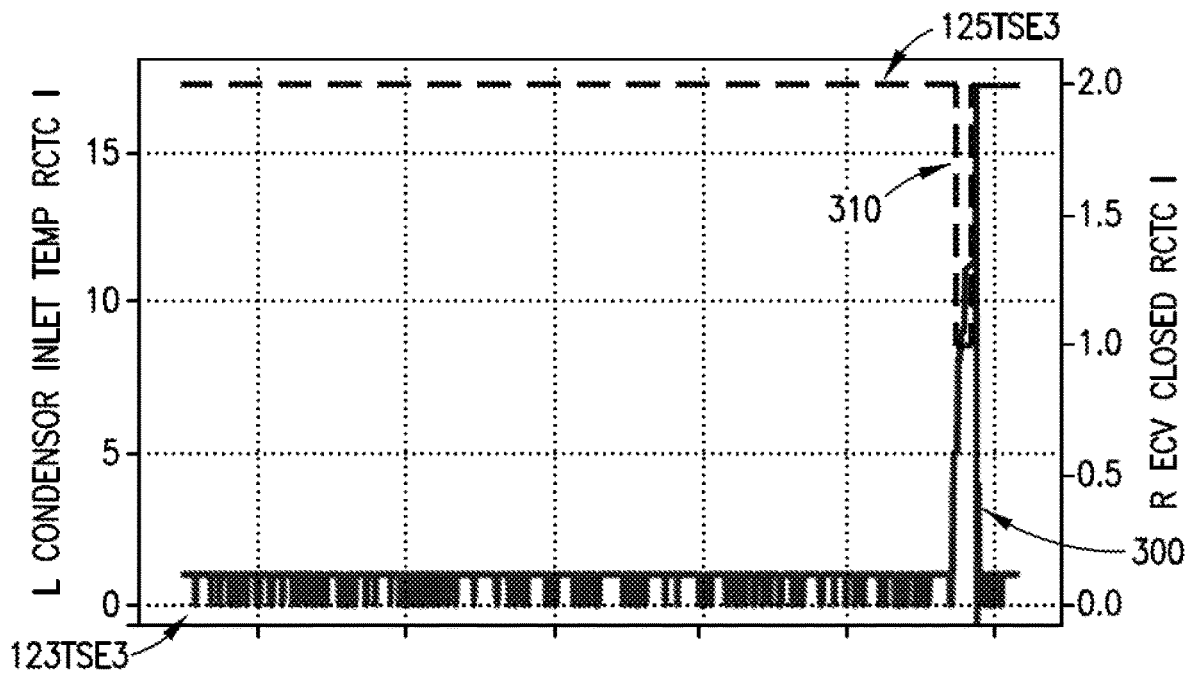
Figure 4A:
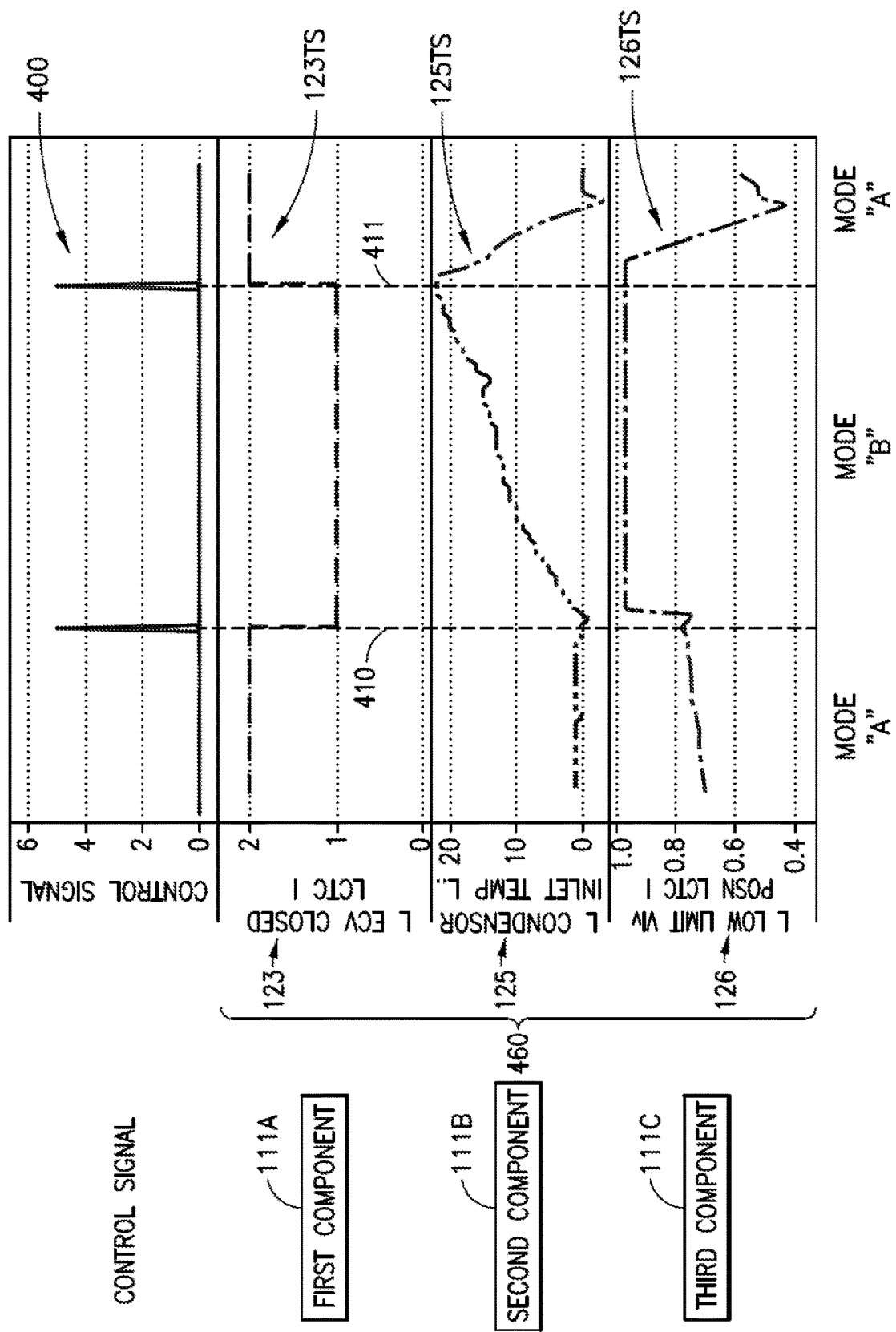
Figure 4B:
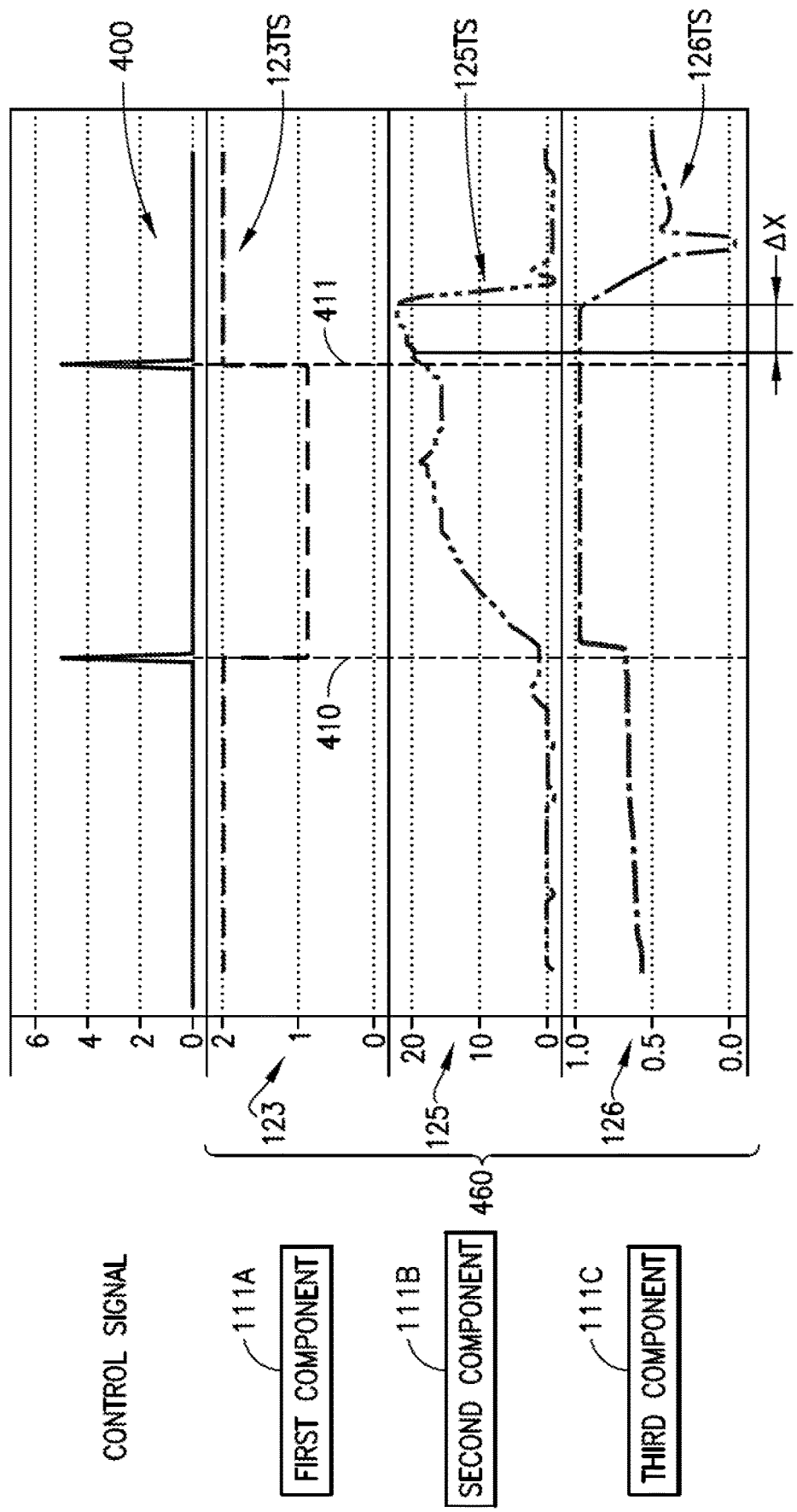
Figure 4C:
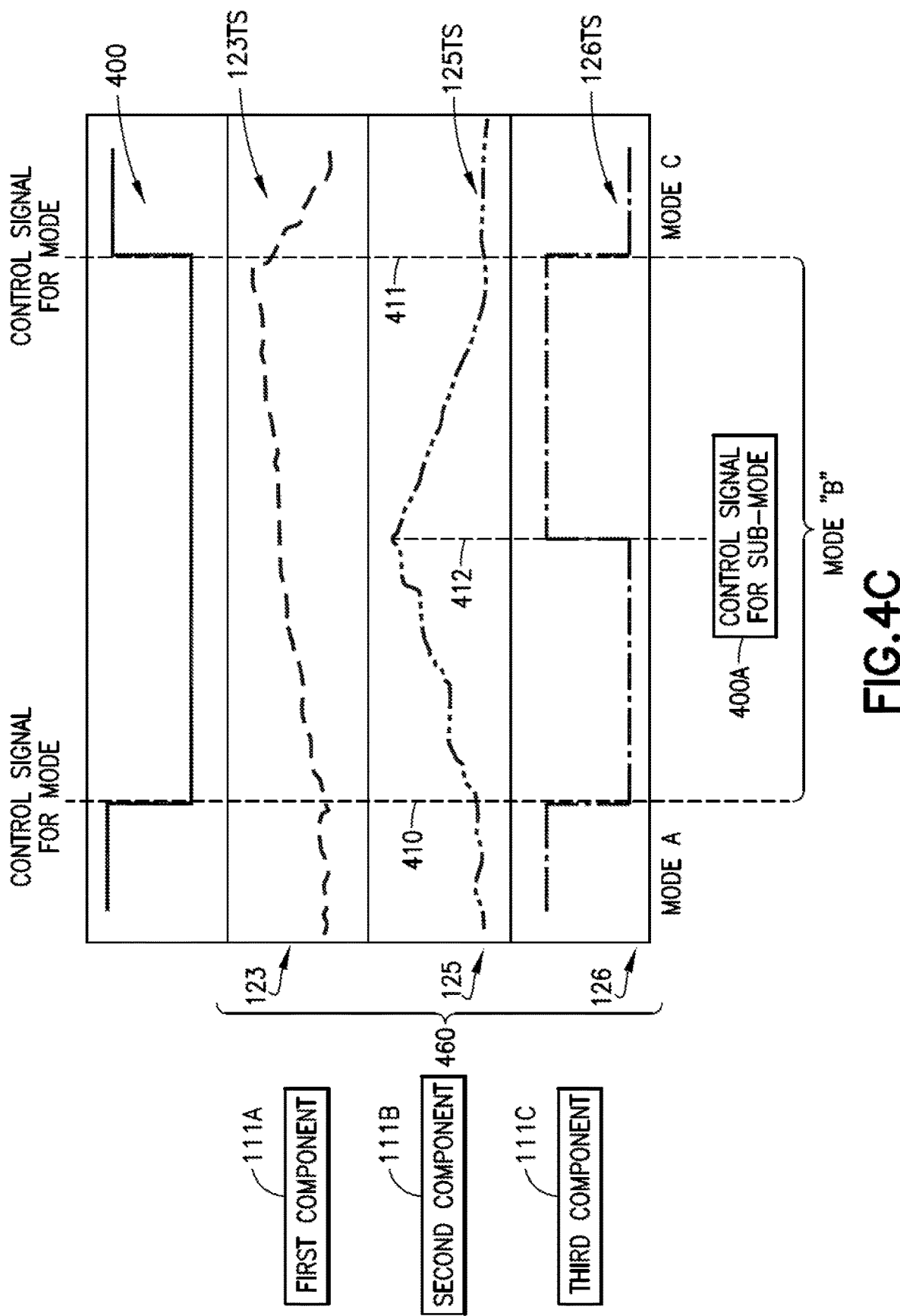
Figure 5A:
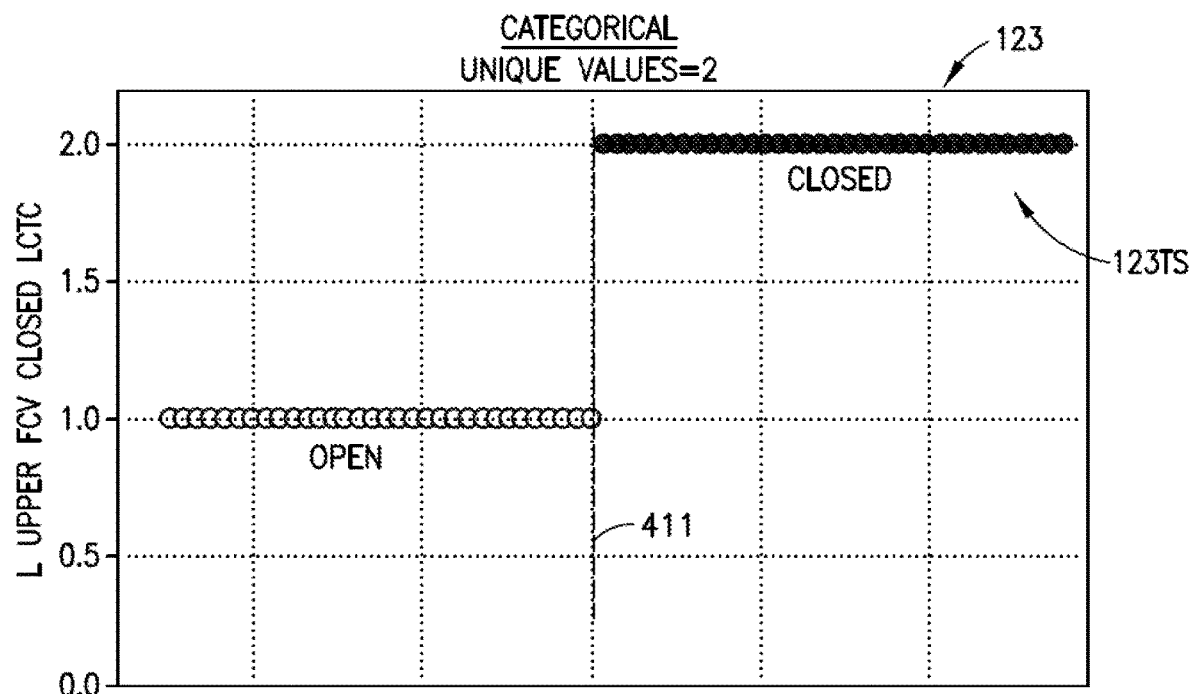
Figure 5B:
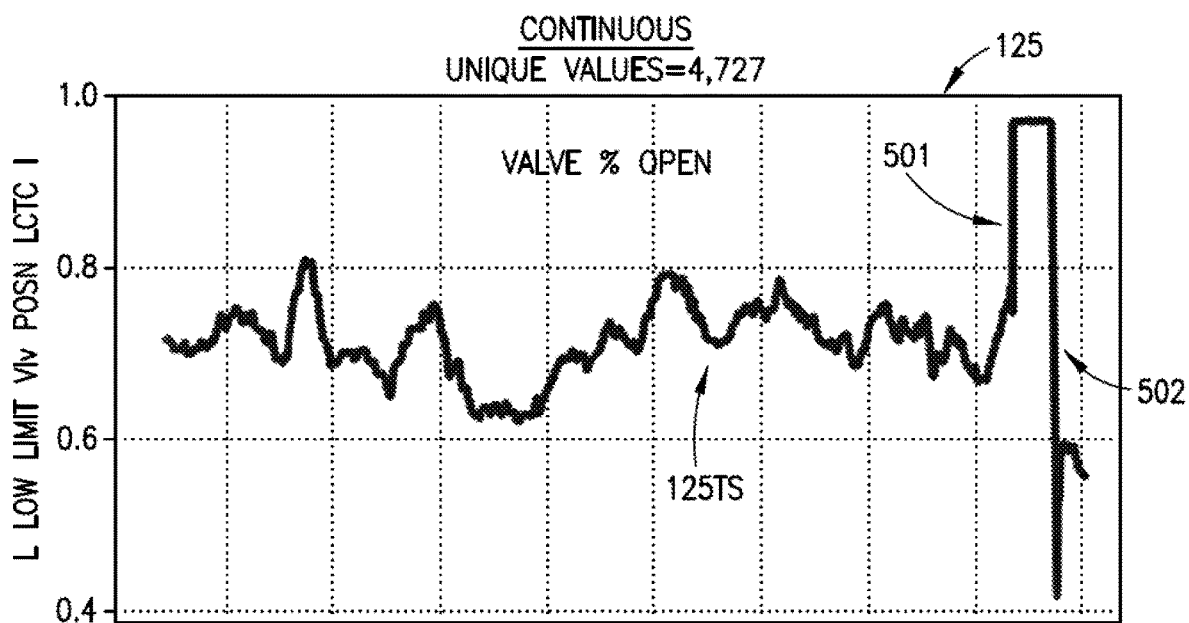
Figure 6A:
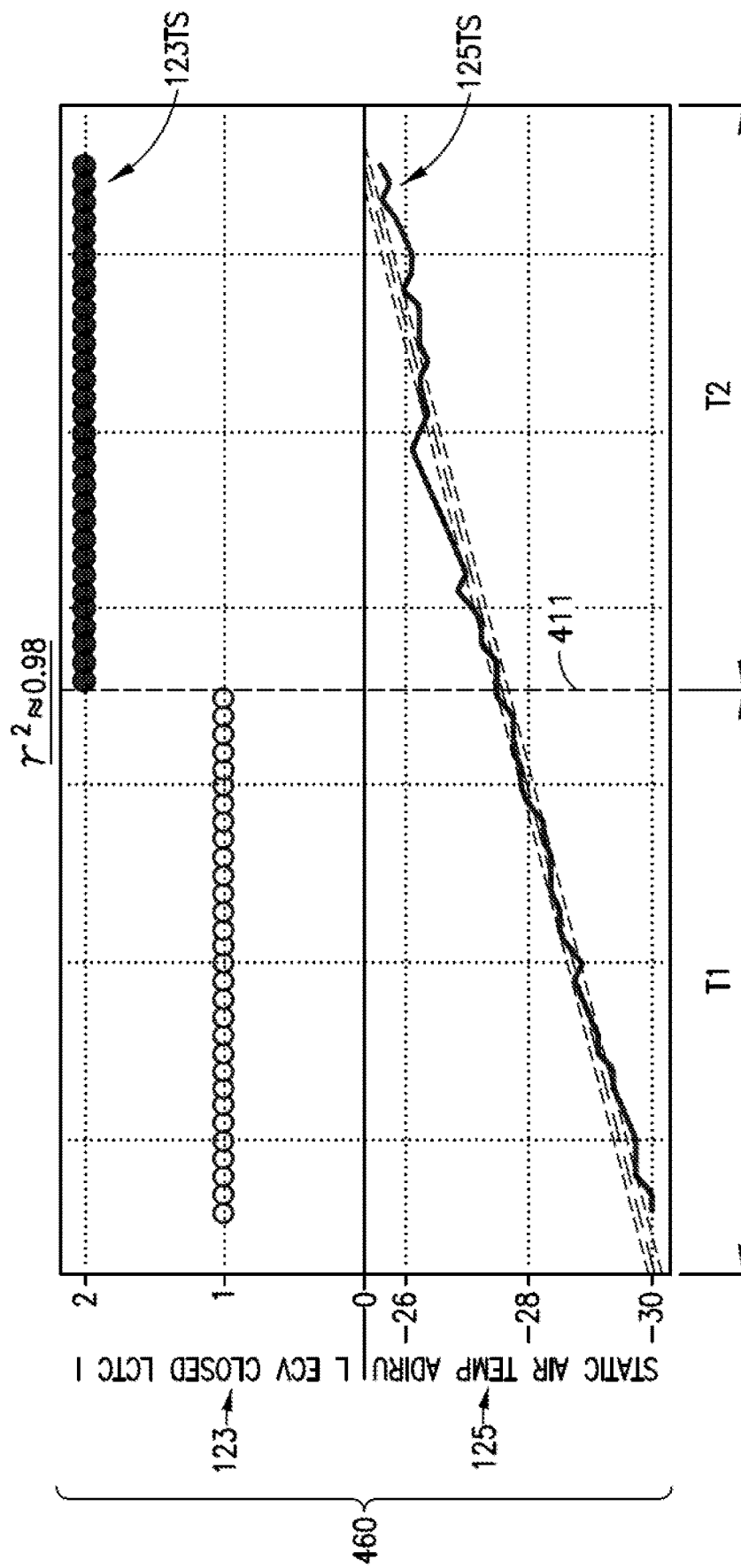
Figure 6B:
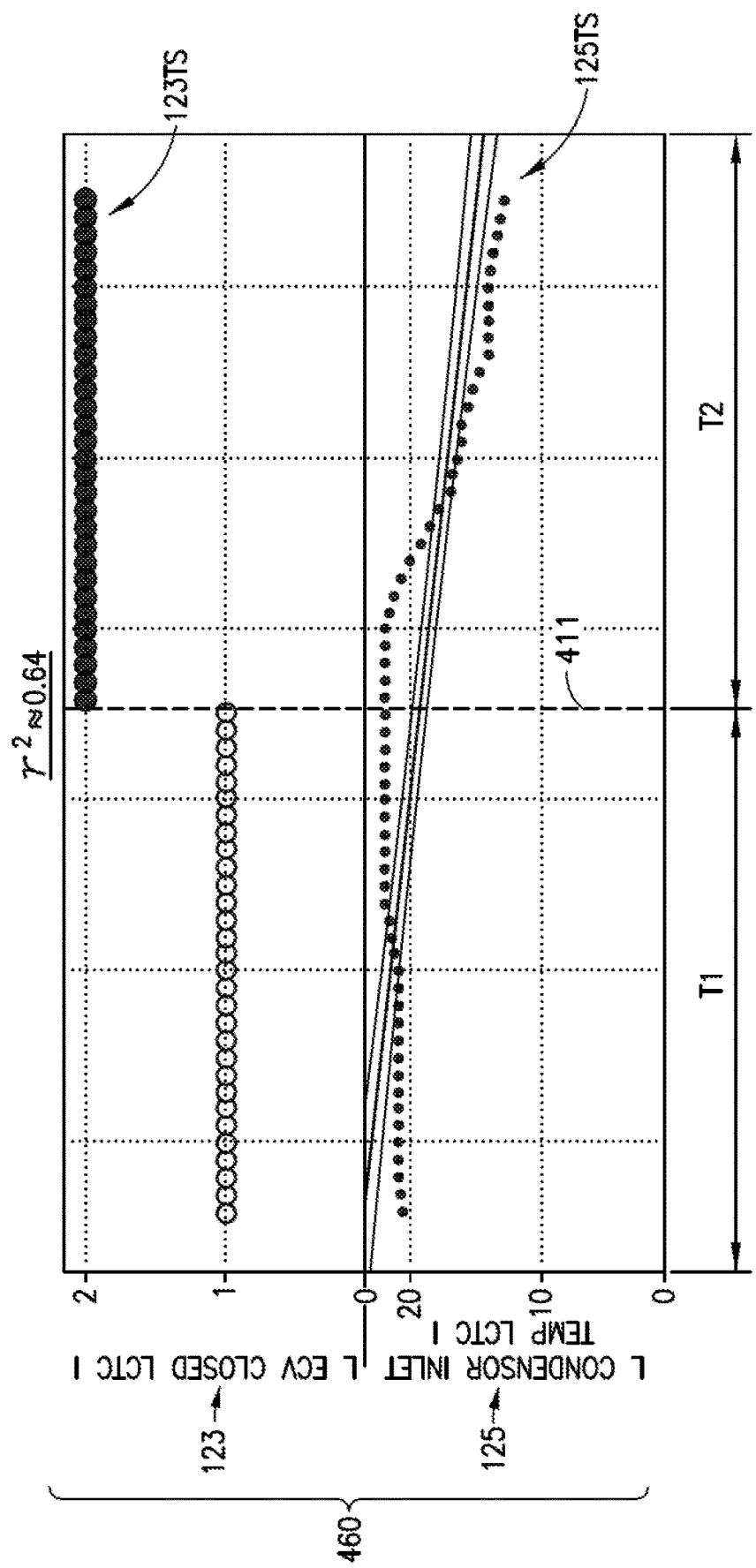
Figure 6C:
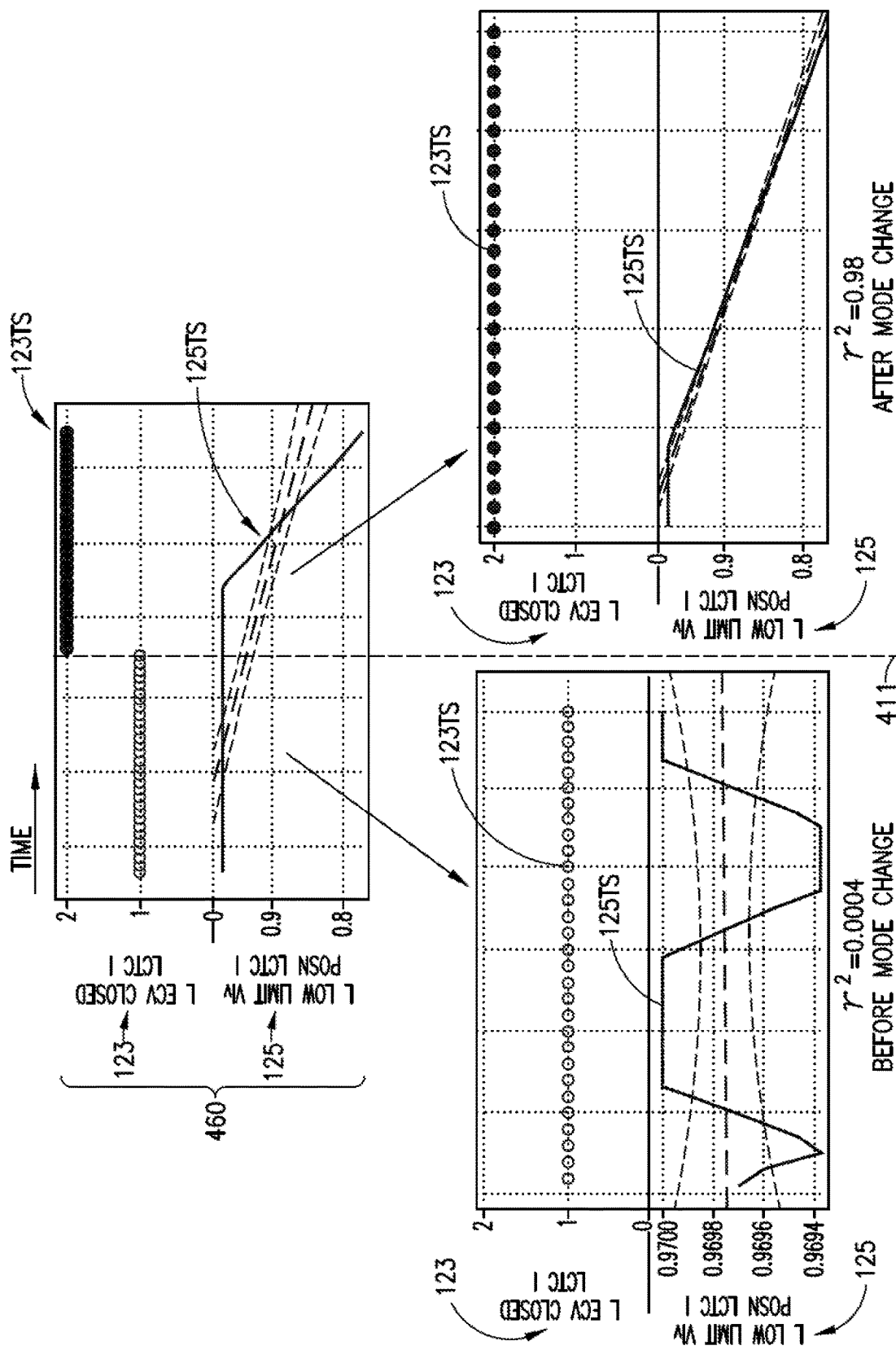
Figure 6D:
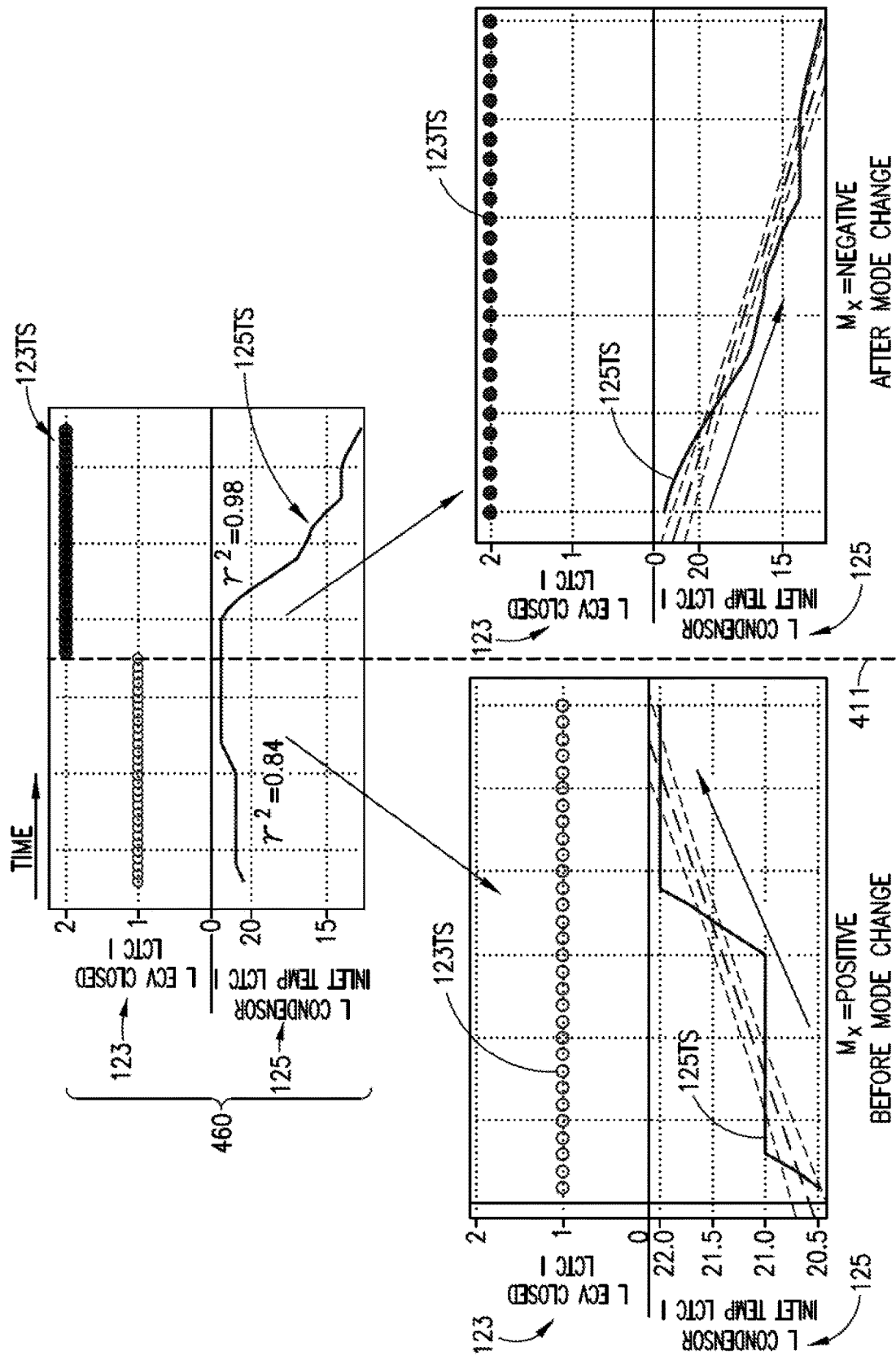
Figure 6E:
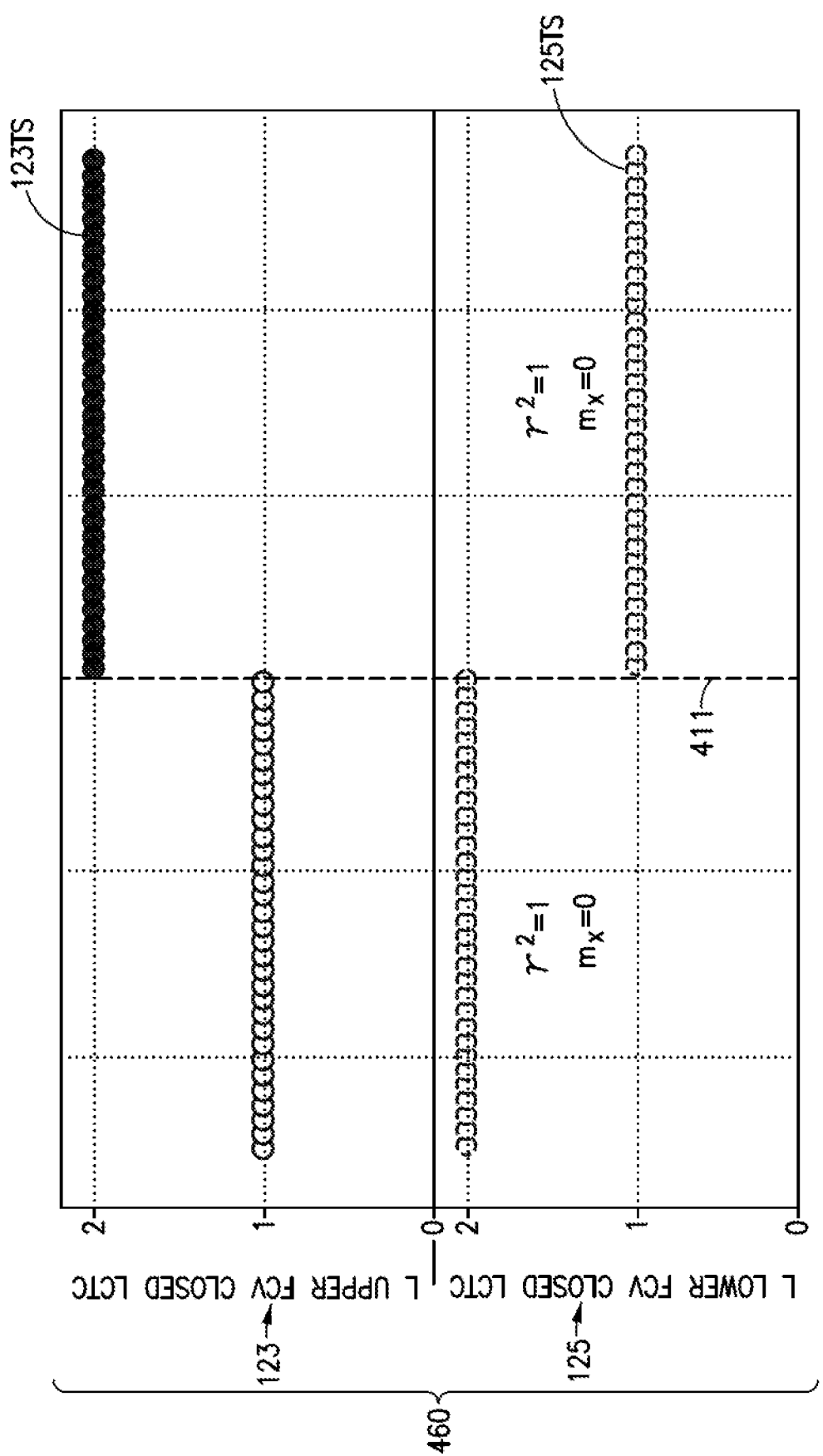
Figure 8A:
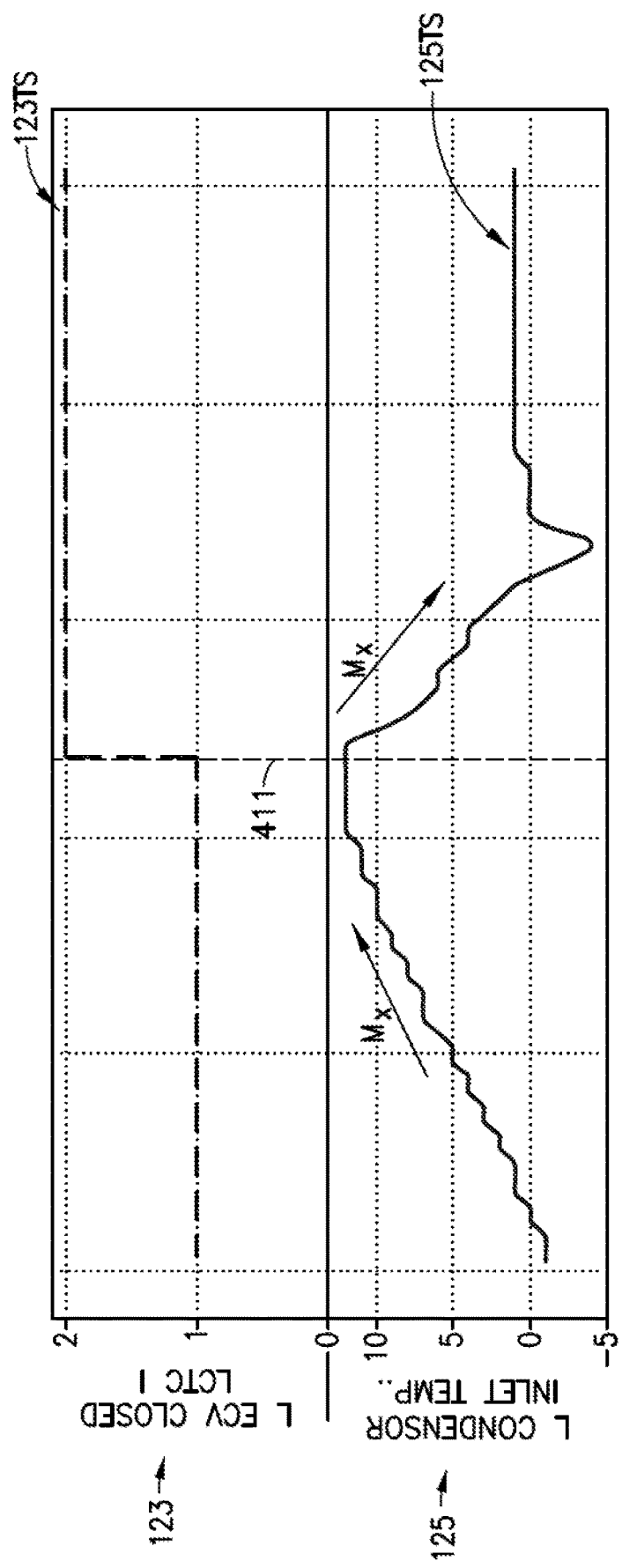
Figure 8B:
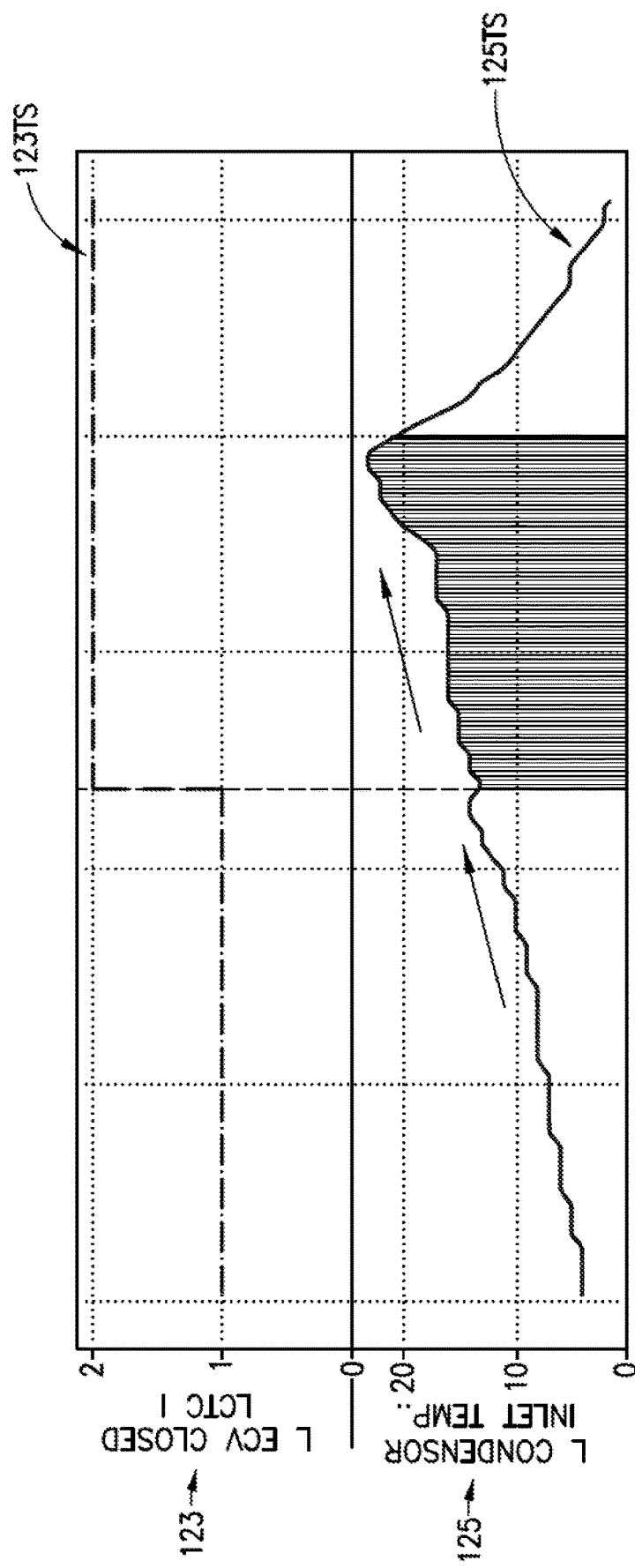
Figure 9A:
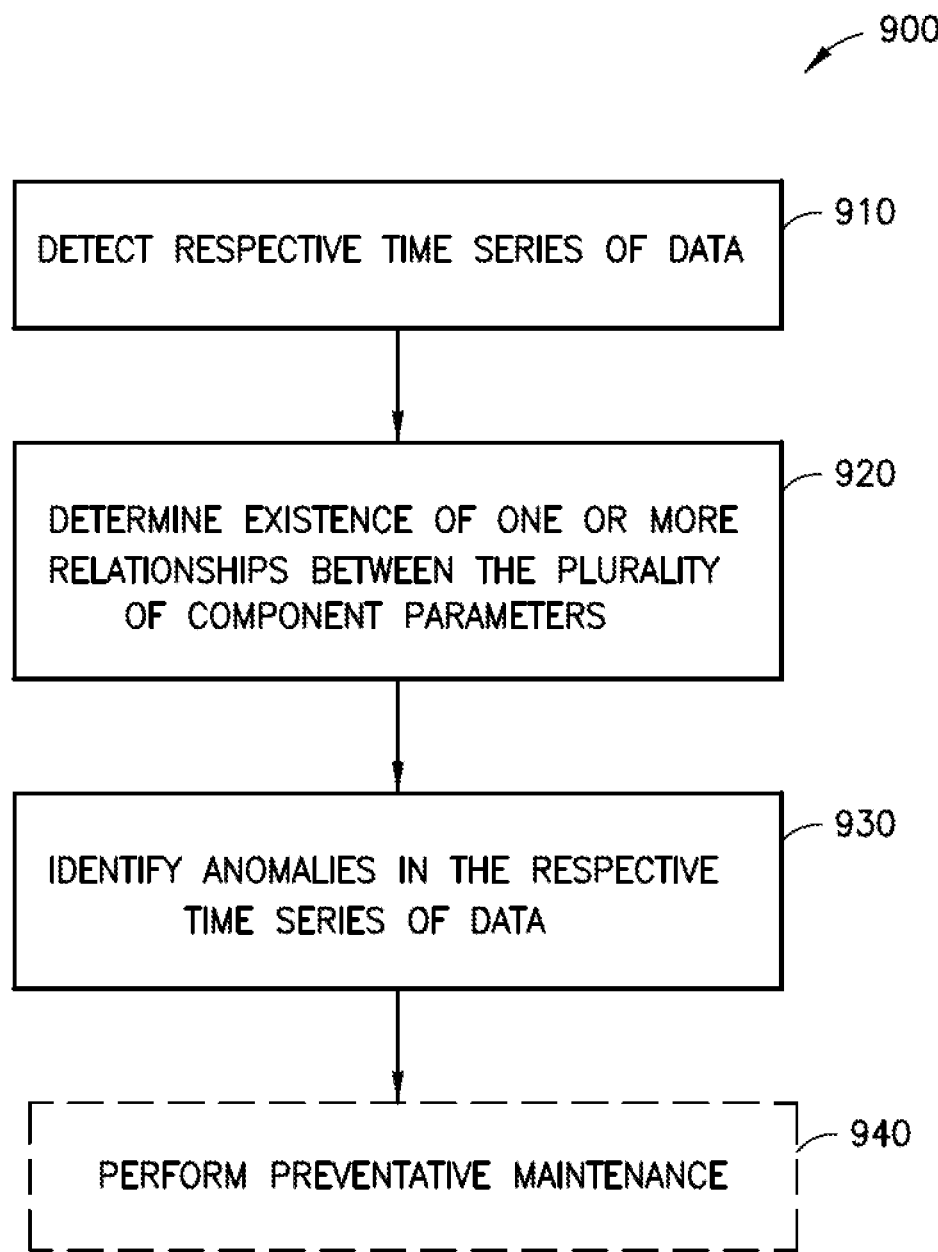
Figure 9B:
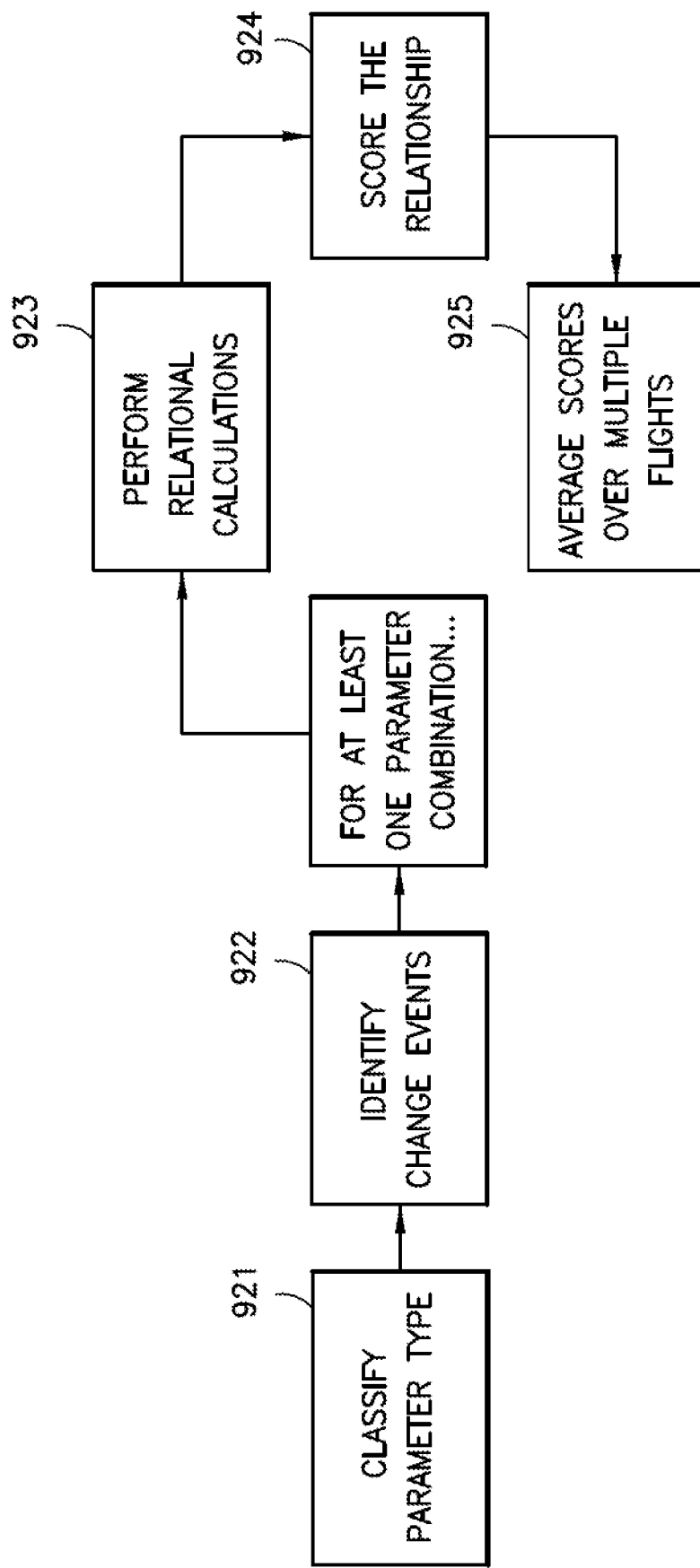
Figure 10:
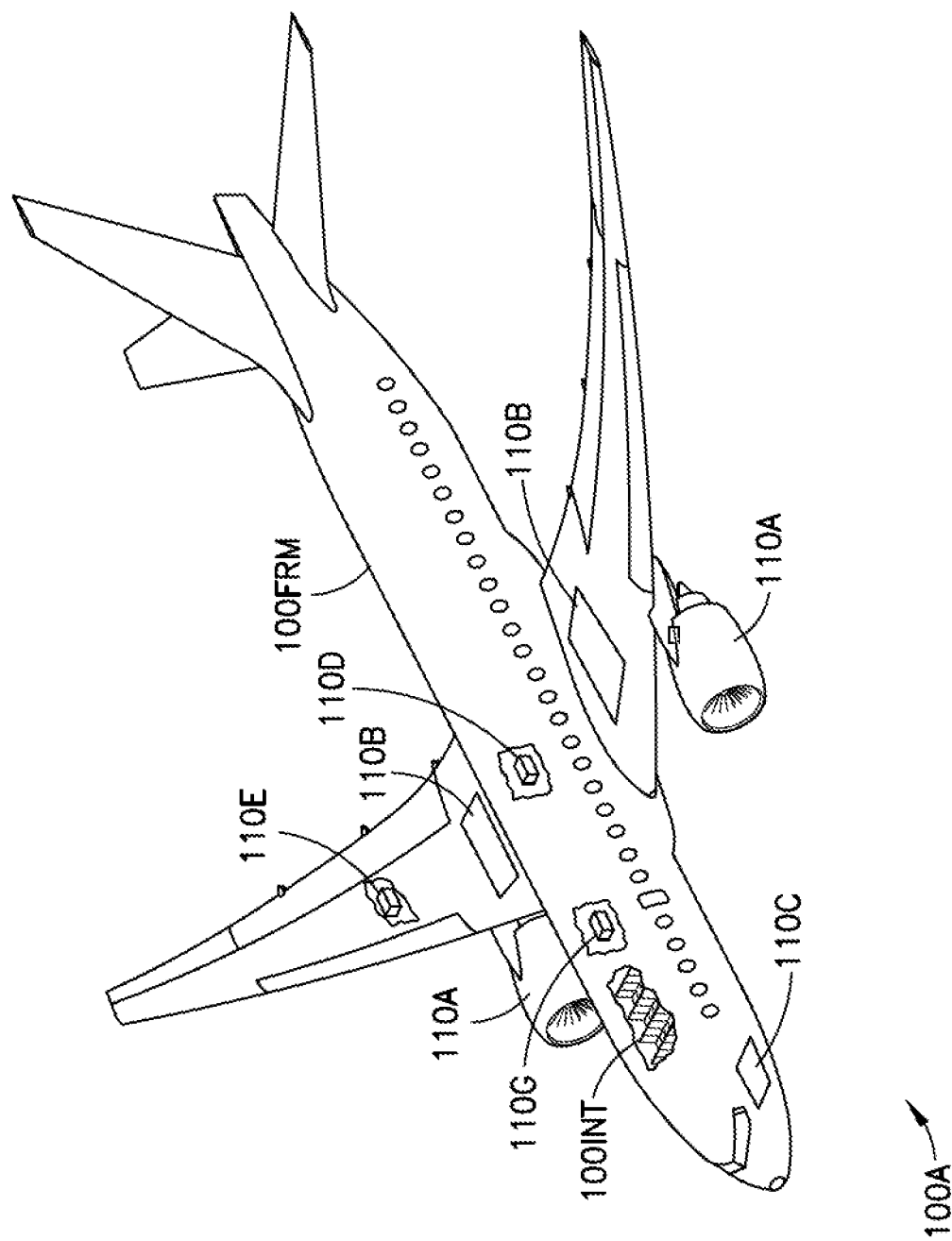
Figure 11:
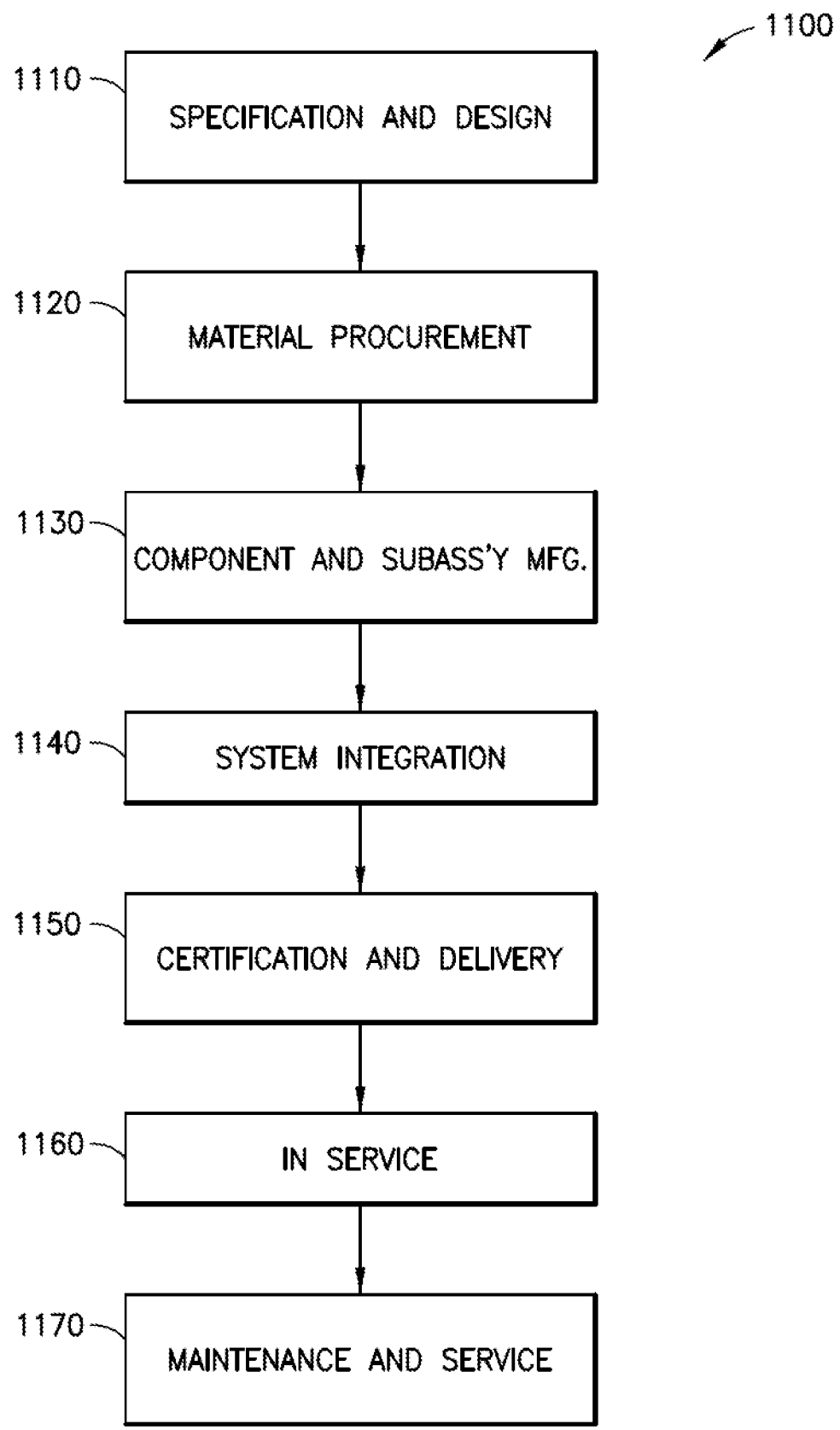

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic block diagram of a vehicle fault detection system in accordance with aspects of the present disclosure;

FIG. 2A is an exemplary illustration of a normal time series of data obtained under fault free normal operating conditions of a vehicle component in accordance with aspects of the present disclosure;

FIG. 2B is an exemplary illustration of a degraded time series of data exhibiting degraded performance of the vehicle component referred to in the description of FIG. 2A in accordance with aspects of the present disclosure;

FIG. 2C is an exemplary illustration of a fault time series of data exhibiting faulty performance of the vehicle component referred to in the description of FIG. 2A in accordance with aspects of the present disclosure;

FIGS. 3A, 3B, and 3C illustrates a relationship between two time series of data corresponding to a first component parameter and a second component parameter occurring over three different excursions of a vehicle, where FIG. 3A corresponds to the first excursion. FIG. 3B corresponds to the second excursion, and FIG. 3C corresponds to the third excursion in accordance with aspects of the present disclosure;

FIG. 4A is an exemplary graph showing time series of data for respective component parameters of a plurality of vehicle system components and illustrating different operating modes of the plurality of vehicle system components in accordance with aspects of the present disclosure;

FIG. 4B is an exemplary graph showing time series of data for respective component parameters of a plurality of vehicle system components and illustrating different operating modes of the plurality of vehicle system components in accordance with aspects of the present disclosure;

FIG. 4C is an exemplary graph showing time series of data for respective component parameters of a plurality of vehicle system components and illustrating different operating modes of the plurality of vehicle system components in accordance with aspects of the present disclosure;

FIG. 5A is an exemplary illustration of a categorical time series of data in accordance with aspects of the present disclosure;

FIG. 5B is an exemplary illustration of a continuous time series of data in accordance with aspects of the present disclosure;

FIG. 6A is an exemplary graph illustrating a lack of a relationship between component parameters in accordance with aspects of the present disclosure:

FIG. 6B is an exemplary graph illustrating a possible relationship between component parameters in accordance with aspects of the present disclosure:

FIG. 6C is an exemplary graph illustrating a determination of a correlation between component parameters before or after a vehicle system component mode change in accordance with aspects of the present disclosure;

FIG. 6D is an exemplary graph illustrating a determination of a slope change of a component parameter before and after a vehicle system component mode change in accordance with aspects of the present disclosure;

FIG. 6E is an exemplary graph illustrating a determination of a value change of a component parameter before and after a vehicle system component mode change;

FIGS. 7A and 7B (referred to herein as FIG. 7) are illustrations of an exemplary relationship output in accordance with aspects of the present disclosure;

FIGS. 8A and 8B are exemplary graphs of time series of data illustrating a detection of an anomaly in the time series of data in accordance with aspects of the present disclosure;

FIG. 9A is an exemplary flow diagram for a method of determining faults in a vehicle system in accordance with aspects of the present disclosure;

FIG. 9B is an exemplary flow diagram of a portion of the method of FIG. 9A in accordance with aspects of the present disclosure;

FIG. 10 is an exemplary illustration of the vehicle in FIG. 1 in accordance with aspects of the present disclosure; and FIG. 11 is an exemplary flow diagram of an aircraft production and service methodology.

DETAILED DESCRIPTION

Referring to FIGS. 1 and 10, the vehicle fault detection system 199 will be described with respect to a fixed wing aircraft, such as aircraft 100A for exemplary purposes only. However, it should be understood that the vehicle fault detection system 199 may be deployed in any suitable vehicle 100, including but not limited to aerospace vehicles, rotary wing aircraft, unmanned aerial vehicles (UAVs), fixed wing aircraft, lighter than air vehicles, maritime vehicles, and automotive vehicles. In one aspect, the vehicle 100 includes one or more vehicle systems 110 each having one or more (e.g., a plurality of) respective components (e.g., engines and components thereof, air conditioning systems and components thereof etc.). The vehicle systems 110 may include propulsion systems 110A, hydraulic systems 110E, electrical systems 110D, main landing gear systems 110B, and nose landing gear system 110C. The vehicle 100 may also include an interior 100INT having an environmental system 110G. In other aspects, the vehicle systems 110 may also include one or more control systems coupled to an airframe 100FRM of the vehicle 100, such as for example, flaps, spoilers, ailerons, slats, rudders, elevators, and trim tabs.

Referring to FIG. 1, the aspects of the present disclosure provide for a system 199 and method 900 (see FIG. 9A) for determining vehicle system 110 faults that may provide for the proactive repair and/or replacement of vehicle system 110 components based upon anomalies detected and identified through an analysis of relationships 140 between the vehicle system 110 components. Complex systems, such as the vehicle systems 110 described herein, may have many components that interact with each other. The aspects of the present disclosure provides for the identification of normal vehicle system 110 behavior through an unsupervised analysis of one or more relationships 140 between the vehicle system 110 components, where the relationships 140 are determined using sensor data from components of the vehicle system 110. As used herein the term "normal" refers to the operation of a vehicle system 110 without any faults (e.g., normal operating conditions as understood in the art). While the aspects of the present disclosure provide for the identification of normal vehicle system 110 behavior, the aspects of the present disclosure may also provide for the identification of anomalous behavior which precedes component faults. As used herein the term "anomalous" refers to a deviation from fault free operation and includes degraded vehicle system 110 (or a component thereof) performance and faulty performance of the vehicle system 110 (or a component thereof).

In accordance with the aspects of the present disclosure, one or more of vehicle system 110 component control signals, vehicle system 110 component inferred operating modes, and sensor data may be analyzed for determining and/or providing a prediction of the vehicle system 110 faults. The inclusion of control signals in the fault determination analysis (e.g., to infer operating mode changes) may eliminate dependency on subject matter experts for fault detection. The aspects of the present disclosure may also reduce or eliminate false positive fault detection by identifying effects on one vehicle system 110 component caused by an operating mode change of another vehicle system 110 component.

The aspects of the present disclosure may identify a type and strength of relationships 140 between time series of data from a plurality of sensors 101 (e.g., component parameters). The aspects of the present disclosure provide for a data driven fault analysis by categorizing the time series of data obtained from the plurality of sensors 101 and analyzes the time series depending on the categorization. The aspects of the present disclosure may also provide for the identification of significant changes (e.g., large changes in sensor values) in component parameter values that may constantly fluctuate as part of their normal behavior as well as relationships between vehicle system 110 component parameters that may only exist in certain circumstances, and are not always present in the sensor data. The fault detection system 199 and method 900 described herein is highly scalable and can be run on many (e.g., tens, hundreds, thousands, etc.) vehicle system 110 component parameters substantially at once over the course of several vehicle excursions (where, in the case of the aircraft 100A, each excursion is an individual flight of the vehicle). As such, the aspects of the present disclosure may provide for the identification of normal (and/or anomalous) behavior of vehicle system 110 components on large, diverse data sets without the need for domain knowledge from subject matter experts.

Illustrative, non-exhaustive examples, which may or may not be claimed, of the subject matter according to the present disclosure are provided below.

Referring to FIG. 1, the vehicle fault detection system 199 includes plurality of sensors 101 including at least a first sensor 101A and a second sensor 101B. Each sensor in the plurality of sensors is configured for coupling with a respective component of a respective vehicle system 110 for detecting respective time series of data of a respective component parameter (FIG. 9A, Block 910). For example, the first sensor 101A may be configured for coupling with a first component 111A of the vehicle system 110 to detect a first time series of data 123TS of a first component parameter 123. The second sensor 101B may be configured for coupling with a second component 111B of the vehicle system 110 to detect a second time series of data 125TS of a second component parameter 125. It is noted that while one vehicle system 110 is illustrated in FIG. 1, the aspects of the present disclosure may be applied to multiple vehicle systems 110 to determine the relationships 140 between the components of the multiple vehicle systems for detecting faults in one or more of the multiple vehicle systems.

A vehicle control module 120 is coupled to the plurality of sensors 101 (e.g., such as the first sensor 101A and the second sensors 101B) in any suitable manner, such as through any suitable wired or wireless connection. The vehicle control module 120 may be any suitable controller onboard the vehicle 100 or any suitable controller that is wirelessly coupled to or hardwired to the vehicle 100 (e.g., such as a vehicle maintenance controller). The vehicle control module 120 may include any suitable memory 121 and processor 130 configured with any suitable data storage and non-transitory computer program code for carrying out the aspects of the present disclosure as described herein, where for example, the plurality of sensors 101 are coupled to the memory 121 so that data (e.g., such as first component data 122 and second component data 124) from the plurality of sensors 101 is stored in the memory 121 in any suitable manner. The vehicle fault detection system 199 may also include any suitable user interface 175 coupled to the vehicle control module 120. The user interface 175 may be a display/interface of the vehicle 100 or a display/interface coupled to the vehicle 100 through a wired or wireless connection. The user interface 175 is configured to present to an operator of the vehicle 100 at least an indication of the anomalies 177 in one or more of the first time series of data 123TS and the second time series of data 125TS. In other aspects, the user interface 175 is configured to present to an operator of the vehicle 100 one or more of an indication of anomalies 177, a prediction of fault 178, preventative maintenance corrective action 179, and a post excursion vehicle maintenance report 176 (where the post excursion vehicle maintenance report includes at least one of the indication of anomalies 177, corrective action 179 and the prediction of fault 178) for the vehicle system 110. In one aspect, user interface 175 may provide, in any suitable manner such as through the post excursion vehicle maintenance report 176 or other suitable report, a vehicle system lockout indication 174 as described herein.

Referring to FIGS. 1, 2A-2C and 3A-3C, generally vehicle system 110 components, such as the first component 111A and the second component 111B, exhibit differing performance throughout a service life of the component. There are generally three classifications of component parameter behavior during the service life of a vehicle system 110 component. These three classifications are generally normal, degraded and faulty. Anomalous behavior is indicative of degraded performance, but not necessarily faulty performance. Recurrence and/or increasing severity of degraded performance indicates that the vehicle system 110 component may soon provide faulty performance. Examples of plots of time series of data obtained from an exemplary vehicle system 110 component corresponding to the normal, degraded and faulty classifications are illustrated in FIGS. 2A-2C. As an example, FIG. 2A illustrates a normal time series of data 200N obtained under fault free normal operating conditions of the component. FIG. 2B illustrates a degraded time series of data 200D exhibiting degraded component performance, which may indicates the vehicle component is nearing an end of its service life. FIG. 2C illustrates a fault time series of data 200F exhibiting faulty component performance which may indicate an end of service life for the vehicle system 110 component.

In addition to indicating the normal, degraded and faulty performance of the vehicle system 110 component, the time series of data may also provide an indication that a sudden change/spike (e.g. large increase in sensor values) in the time series of data is a normal operating characteristic of the vehicle system 110 component. For example, FIGS. 3A-3C illustrates time series of data for three different excursions of the vehicle 100 where each of FIGS. 3A-3C show time series of data corresponding to a first component parameter 123 (for the first component 111A) and a second component parameter 125 (for the second component 111B). In FIGS. 3A and 3B a first time series of data for the first and second excursion 123TSE1, 123TSE2 (for the first component parameter 123) illustrates normal operation of the first component 111A, while the a second time series of data for the first and second excursion 125TSE2, 125TSE2 (for the second component parameter 125) illustrates normal operation of the second component 111B. However, in FIG. 3C the first time series of data for the third excursion 123TSE3 of the first component 111A shows a first sensor data spike 300 (e.g., large change in sensor values) toward the right hand side of the graph. The first sensor data spike 300 in the first time series of data for the third excursion 123TSE3 considered alone may be indicative of an anomaly and indicate a fault in the first component parameter 123; however, when the first sensor data spike 300 is considered in conjunction with the second time series of data for the third excursion 125TSE3 of the second component 111B, it can be seen that the second time series of data for the third excursion 125TSE3 includes a corresponding second sensor data spike 310. The corresponding first and second sensor data spikes 300, 310 may indicate a relationship 140 between the first component parameter 123 and the second component parameter 125, and the aspects of the present disclosure may identify this relationship 140 in the fault analysis. For example, the second data spike 310 may be the result of a mode change of the second component 111B that causes an effect on the first component parameter 123 under normal operating conditions. As such, it is desired to recognize that vehicle systems 110 have different operating states or operating modes when interpreting time series of data, such as the first time series of data 123TS and the second time series of data 125TS. It should also be recognized that it is normal for vehicle system 110 parameters, such as the first component parameter 123 and the second component parameter 125, to exhibit distinct behavior in various operating modes.

Referring to FIGS. 1 and 4A-4B, the different operating modes of the plurality of vehicle system 110 components 111 and their respective component parameters (e.g., a plurality of component parameters 460 which may include the first component parameter 123 and the second component parameter 125) may be triggered by a control signal 400 sent to one of the plurality of components 111 by any suitable controller of the vehicle 100 and/or controller of the vehicle system 110. For example, FIG. 4A illustrates a plot comparing a first time series of data 123TS for the first component 111A, a second time series of data 125TS for the second component 111B and a third time series of data 126TS of a third component 111C with the control signal 400. As can be seen in FIG. 4A, the control signal 400 causes a change in operating modes of the first time series of data 123TS so that the first time series of data 123TS exhibits three modes of operation, e.g., mode A, mode B and mode C, where the change between adjacent modes A, B, C are indicated by the mode changes 410, 411. When the control signal 400 changes the first component 111A, the second component 111B, and the third component 111C each exhibit distinctly different behavior where the change in behaviors is used by the fault detection system 199 described herein to identify normal vehicle system 110 behavior. As such, the fault detection system 199 is an unsupervised system that incorporates domain knowledge of the vehicle system 110 substantially without the need for subject matter experts. Once normal vehicle system behavior 110 is identified, the plurality of sensors 101 can be monitored to detect degraded performance (as illustrated in FIG. 4B by the mode change delay ΔX in the second and third time series of data 125TS, 126TS after the mode change 411) and/or predict faults as described herein.

Referring to FIGS. 1 and 4C in addition to the mode changes 410, 411 the fault detection system 199 is configured to identify sub-mode changes which may further identify sub-relationships 140 between the vehicle system 110 components, such as the first component 111A, the second component 111B, and the third component 111C. For example, it may be desired to identify complex operational modes, in which multiple operational modes occur substantially simultaneously (e.g., one or more mode changes of one component parameter within at least one mode of another component parameter), even though the component parameters may be controlled independently of one another. As an example, FIG. 4C illustrates the control signal 400 causing mode changes 410, 411 in the first component parameter 123 so that the first component parameter 123 exhibits three operational modes, e.g., modes A, B, C. In this example, a control signal 400A may be sent to the third component 111C at mode change 412 where the mode change 412 of third component parameter 126 effects a change in the second component parameter 125, but not the first component parameter 123. The change in the second component parameter 125 at the mode change 412 may indicate a further relationship 140 between the second component parameter 125 and the third component parameter 126 within operational mode B of the first component parameter 123. As such, the fault detection system 199 may also incorporate domain knowledge of the vehicle system 110 sub-modes substantially without the need for subject matter experts, for identifying normal vehicle system behavior 110.

Referring to FIGS. 1, 5A and 5B, to detect the operational modes of the plurality component parameters 460 (FIGS. 4A-4C) and identify the relationships 140 between the plurality component parameters, the vehicle control module 120 includes a relationship determining module 131 configured to determine the existence of a relationship 140 between the plurality component parameters 460, such as the first component parameter 123 and the second component parameter 125, corresponding to the plurality of vehicle components 111. For example, to determine the existence of one or more relationships 140 between the plurality of component parameters 460 (FIG. 9A, Block 920 described herein), the relationship determining module 131 is configured to classify one or more (or each) of the plurality of component parameters 460 (FIGS. 4A-4C) (FIG. 9B, Block 921) as being one of categorical (an example of which is illustrated in FIG. 5A) or continuous (an example of which is illustrated in FIG. 5B). In other aspects, any suitable categorization of the component parameters may be used. The categorical component parameters include, for example, sensor values that represent discrete states/operational modes, such as on/off, open/closed, etc. As an example of a categorical component parameter, FIG. 5A illustrates a time series of data representing an open and closed position of, for example, a valve of the environmental system 110G (see FIG. 10). Continuous component parameters include sensor values that may have an infinite number of sensor value possibilities (e.g., a percentage, voltage, current, temperature, etc.). As an example of a continuous component parameter, FIG. 5B illustrates a time series of sensor data representing a percentage the valve of the environmental system 110G (see FIG. 10) is open. The relationship determining module 131 may be configured to categorize the plurality component parameters 460 (FIGS. 4A-4C) by, for example, counting the unique/distinct values exhibited by the component parameters. As an example, if a component parameter has less than about 15 unique/distinct values (or any other suitable value) the component parameter is classified as categorical, otherwise the component parameter is classified as continuous.

Referring to FIGS. 1, 4A-4C, and 5A-5B with the plurality of component parameters 460 classified as categorical or continuous, the vehicle control module 120, such as through the relationship determining module 131, determines the existence of the relationship 140 between the plurality of component parameters 460 by determining any effects on one of the plurality of component parameters (e.g., such as one of the first component parameter 123 and the second component parameter 125) caused by another of the plurality of component parameters (e.g., such as another of the first component parameter 123 and the second component parameter 125). The vehicle control module 120 is configured to identify mode change 410-412 (see FIGS. 4-4C) events (FIG. 9B, Block 922) within one or more of the respective time series of data based on the vehicle system control signal 400 (see FIGS. 4A-4C). The mode change 410-412 events may be different for the categorical and continuous classifications of the plurality of component parameters 460. For example, a mode change 411 event for a component parameter having a categorical classification (such as the first component parameter 123 shown in FIG. 5A) is identified with each value change of the first component parameter 123. A mode change 410-412 event for a component parameter having a continuous classification (such as the second component parameter 125 shown in FIG. 5B) is identified by a significant change in value 501, 502 in the second time series of data 125TS for that second component parameter 125 within a predefined time window. For example, the significant change in value may be defined as a change in value of the second time series of data 125TS that is greater than two standard deviations within about a five second (or other suitable time) time window. The mode change 410-412 events may be identified as increases or decreases, where increases or decreases in value of a component parameter may effect different types of behavior with other component parameters in the plurality of component parameters 460 as described herein.

Referring to FIGS. 1 and 6A-6C, with the mode change events 410-412 (FIGS. 4A-4C) identified, the vehicle control module 120 is configured to determine whether a relationship 140 exists between one or more of the plurality of component parameters 460 by performing relational calculations (FIG. 9B, Block 923) using, for example, the following formula:

$$[r_{ba}^2 < t_1][([r_b^2 > t_2] + [r_a^2 > t_2] = 1] + [[r_b^2 > t_2] + [r_a^2 > t_2] = 2]*[[m_b > 0] + [m_a > 0] = 1] + [[r_b^2 > t_2 + [r_a^2 > t_2] = 2]*[[\Sigma_{i=0}^{30}[x > abs(\lambda \cdot 2\sigma)]] > 0]) > 0]$$

where each bracket in the formula evaluates to 1 if true and to 0 if false. If none of the brackets in the formula are true, then the formula resolves to 0 and it is determined that there is no direct relationship between the first and second component parameters (noting that the formula is written for two component parameters but may be adapted to any number of component parameters). Further, $t_1$ is a threshold (e.g., an $r^2$ value of about 0.9) for a strong correlation between parameters before and after a mode change 410-412, and $t_2$ is a threshold (e.g., an $r^2$ value of about 0.6) for a strong correlation between parameters before or after a mode change 410-412. Here the formula includes four parts as follows:

$$[r_{ba}^2 < t_1] \quad \text{[part 1]}$$

$$[[r_b^2 > t_2] + [r_a^2 > t_2] = 1] \quad \text{[part 2]}$$

$$[[r_b^2 t_2] + [[r_a^2 > t_2] = 2]*[[m_b > 0] + [m_a > 0] = 1] \quad \text{[part 3]}$$

$$[[r_b^2 > t_2] + [r_a^2 > t_2] = 2]*[[\Sigma_{i=0}^{30}[x > abs(\mu * 2\sigma)]] > 0] \quad \text{[part 4]}$$

where:

$$r_{ba} = \frac{\sum_{i=-30}^{30}(x_i - \bar{x})(y_i - \bar{y})}{\sqrt{\sum_{i=-30}^{30}(x_i - \bar{x})^2 \sum_{i=-30}^{30}(y_i - \bar{y})^2}}$$

$$r_a = \frac{\sum_{i=0}^{30}(x_i - \bar{x})(y_i - \bar{y})}{\sqrt{\sum_{i=0}^{30}(x_i - \bar{x})^2 \sum_{i=0}^{30}(y_i - \bar{y})^2}}$$

$$r_b = \frac{\sum_{i=-30}^{0}(x_i - \bar{x})(y_i - \bar{y})}{\sqrt{\sum_{i=-30}^{0}(x_i - \bar{x})^2 \sum_{i=-30}^{0}(y_i - \bar{y})^2}}$$

$$m_a = \frac{\left(\sum_{i=0}^{30} y\right)\left(\sum_{i=0}^{30} x^2\right) - \left(\sum_{i=0}^{30} x\right)\left(\sum_{i=0}^{30} xy\right)}{n\left(\sum_{i=0}^{30} x^2\right) - \left(\sum_{i=0}^{30} x\right)^2}$$

$$m_b = \frac{\left(\sum_{i=-30}^{0} y\right)\left(\sum_{i=-30}^{0} x^2\right) - \left(\sum_{i=-30}^{0} x\right)\left(\sum_{i=-30}^{0} xy\right)}{n\left(\sum_{i=-30}^{0} x^2\right) - \left(\sum_{i=-30}^{0} x\right)^2}$$

and x represents the elapsed time from the start of the time series for the dependent component parameter and y represents the sensor value for the dependent parameter at time x, the subscript "a" denotes after a mode change, the subscript "b" denotes before a mode change, and the subscript "ba" denotes before and after a mode change. In one aspect, the vehicle control module 120 is configured to apply the formula to at least one combination of plurality of component parameters 460 (e.g., the formula is applied to two component parameters). In other aspects, the vehicle control module 120 is configured to apply the formula for every combination of the plurality of component parameters 460 (e.g., referring to FIG. 4A the combinations may include the first and second component parameters 123, 125, the first and third component parameters 123, 126, the second and third component parameters 125, 126, etc.). As an exemplary application of the above formula, referring to FIG. 4A, the control signal 400 is applied to the first component 111A so that the first component parameter 123 has two mode change 410, 411 events. As such, the first component parameter 123 is considered as the controlling component parameter (x) for defining the mode changes 410, 411 for purposes of applying the above formula. The second and third component parameters 125, 126 are referred to herein as dependent component parameters because the values of the second and third component parameters may depend/be related (based on the outcome of the above formula) to the first component parameter as shown by the changes of the second and third component parameters 125, 126 at the mode changes 410, 411 illustrated in FIG. 4A. The formula, as written above, would be applied to the first and second component parameters 123, 125 and to the first and third component parameters 123, 126 to determine whether each of the second and third component parameters 125, 126 have a relationship with the first component parameter 123.

Using part 1 of the above formula, the vehicle control module 120 is configured to determine any effects on one of the plurality of component parameters 460 (such as the first component parameter 123 and the second component parameter 125) caused by another of the plurality of component parameters 460 (such as the first component parameter 123 and the second component parameter 125) by comparing a predetermined characteristic of one or more of the respective time series of data (such as the first time series of data 123TS and/or the second time series of data 125TS) before and after the mode change events 410-412. The vehicle control module 120 may be configured to define a predetermined time period T1, T2 (such as about thirty seconds or any other suitable time period—see FIGS. 6A and 6B) before and after the mode change 410-412 for comparing the predetermined characteristic. In one aspect, the time period T1 before a respective mode change 410-412 and the time period T2 after the respective mode change 410-412 may be same or different from each other. As an example, FIGS. 6A and 6B illustrate the first time series of data 123TS and the second time series of data 125TS before and after the mode change 411. Here the predetermined characteristic is a coefficient of determination $r^2$ of one or more of the respective time series of data 123TS, 125TS across the mode change 411 event(s). The vehicle control module 120 may define a predetermined threshold value for the coefficient of determination $r^2$, where if the value of coefficient of determination $r^2$ is above the threshold any possible relationship between the component parameters 123, 125 corresponding to the time series of data (such as the first and second time series of data 123TS, 125TS) is ignored. In one aspect, the predetermined threshold value for the coefficient of determination $r^2$ is about 0.9 or greater or about 0.0 for segments of a time series of data on both sides of a mode change and about 0.6 or greater or about 0.0 for a segment of a time series on only one side of a mode change (in other aspects the predetermined threshold value may be any suitable value between 0.0 and 1.0). As shown in FIG. 6A, the coefficient of determination $r^2$ for the first and second time series of data 123TS, 125TS is about 0.98 and as such it is determined that no relationship exists between the first component parameter 123 and the second component parameter 125. As shown in FIG. 6B, the coefficient of determination $r^2$ for the first and second time series of data 123TS, 125TS is about 0.64 and as such it is determined that a relationship 140 may exist between the first component parameter 123 and the second component parameter 125.

Referring to FIGS. 1 and 6C, where the relationship determining module 131 determines a relationship 140 may exist between the plurality of component parameters 460, the vehicle control module 120 determines with part 2 of the above formula whether a correlation exists, either before or after the mode change (such as mode change 411) between the plurality of component parameters 460. As can be seen in FIG. 6C illustrates an example where a correlation exists after the mode change 411 but not before the mode change 411.

Referring to FIGS. 1 and 6D, where the relationship determining module 131 determines a relationship 140 may exist between the plurality of component parameters 460, the vehicle control module 120 determines with part 3 of the above formula, where the component parameter is categorized as continuous, a change in slope of the respective time series of data across the mode change events. For example, the vehicle control module 120 is configured to determine whether a correlation exists before and after the mode change (such as mode change 411) between the plurality of component parameters 460, and whether the slope $M_x$ of one of the component parameters 123, 125 (where the component parameter has a continuous classification) has changed. FIG. 6D is an illustration of where the slope $M_x$ of the time series of data 125TS for the second component parameter 125 has changed from a positive slope $M_x$ to a negative slope $M_x$.

Referring to FIGS. 1 and 6E, where the relationship determining module 131 determines a relationship 140 may exist between the plurality of component parameters 460, the vehicle control module 120 determines with part 4 of the above formula, where the component parameter is categorized as categorical or continuous, a change in magnitude of the respective time series of data across the mode change events. For example, the vehicle control module 120 is configured to determine whether a correlation exists, either before or after the mode change (such as mode change 411) between the plurality of component parameters 460, and whether the slope $M_x$ of one of the component parameters 123, 125 differs (where the component parameter has a categorical or continuous classification). Here the mean µ and standard deviation a are calculated for the interval before the mode change 411. If any sensor values in the first and/or second time series of data 123TS, 125TS fall outside, e.g., two standard deviations (in other aspects more or less than two standard deviations may be used or any other suitable threshold may be used) the value changes are identified as significant parameter value changes. FIG. 6E illustrates an example where the slopes $M_x$ do not differ and the value for the coefficient of determination $r^2$ is above the predetermined threshold value for the coefficient of determination $r^2$ (e.g., there is no significant value change).

Referring to FIGS. 1 and 7, once the relationships 140 between the plurality of component parameters 460 are identified, the vehicle control module 120 is configured to score the relationships (FIG. 9B, Block 924) in any suitable manner. For example, to score the relationships, the values for parts 1-4 of the formula are combined according to the formula where:

part 1 will evaluate to a 1 if there is not a strong correlation for the total segment (before and after the mode change 411, see e.g., FIG. 4A) of the time series of data for the dependent component parameter, part 2 will evaluate to 1 if one of the slopes (before or after the mode change, but not both) of the time series of data for the dependent component parameter has a strong correlation, part 3 will evaluate to 1 if both of the slopes (before and after the mode change) have a strong correlation and the slopes are in different directions, and part 4 will evaluate to 1 if both of the slopes (before and after the mode change) have a strong correlation and at least one of the values after the mode change is more than 2 standard deviations away from the mean before the mode change.

If part 1 evaluates to 1 and the sum of parts 2-4 is greater than 0, then the vehicle control module determines that a relationship exists between the component parameters being evaluated in the component parameter combination(s). Based on the formula the relationship score 141 may be a value between 0 and 3.

The relationship scores 141 are averaged over multiple excursions of the vehicle (FIG. 9B, Block 925) to produce an average relationship score 142 which may be represented as a relationship percentage (see FIG. 7) for the plurality of component parameters 460. For example, an exemplary relationship output 700 of the vehicle control module 120 is illustrated in FIG. 7 and may be included in a post excursion vehicle maintenance report 176 presented on the user interface 175. For exemplary purposes only the relationship output 700 represents twelve sensor parameters (e.g., the plurality of component parameters 460) from an environmental system 110G (see FIG. 10) of the aircraft 100A. Parameter 1 in the relationship output 700 represents the controlling component parameter and parameter 2 in the output represents the dependent component parameter or vice versa (e.g., for purposes of applying the above formula).

As described above, the mode change 410-412 events (see e.g., FIG. 4A) may be identified as increases or decreases, where increases or decreases (e.g., a change type) in value of a component parameter may effect different types of behavior with other component parameters in the plurality of component parameters 460. The change types may be indicated in the relationship output 700 to identify how the change type of the controlling component parameter effects the dependent component parameter. For example, an increasing change (+) to the left economy cooling valve results in a slope change to the left condenser inlet temperature. In the relationship output 700 the higher the relationship percentage the greater the relationship is between the component parameters.

Referring to FIGS. 1, 8A and 8B the vehicle control module 120 is configured to identify anomalies in the respective time series of data (such as one or more of the first and second time series of data 123TS, 125TS for the first and second component parameters 123, 125) (FIG. 9A, Block 930) based on the one or more relationships 140 between the plurality of component parameters 460 (such as the first and second component parameters 123, 125). The vehicle control module 120 is configured to receive or otherwise obtain, from any suitable data source or data base, respective historical time series of data (such as first and second historical time series of data 123HS, 125HS) for the plurality of component parameters 460. For example, the vehicle control module obtains the first historical time series of data 123HS which includes historical data for the first component parameter 123, and obtains the second historical time series of data 125HS which includes historical data for the second component parameter 125. Each of the respective historical time series of data 123HS, 125HS includes respective component data that is labeled as corresponding to one or more of normal component operation 123HN, 125HN and anomalous component operation 123HA, 125HA. The vehicle control module 120 is configured to determine an existence of one or more historical relationships 145 between the plurality of component parameters 460 using the labeled historical time series of data 123HS, 125HS in the manner described above, such as by determining operating modes/sub-modes based on one or more control signals and using the formula in the manner described above. The vehicle control module 120 includes an anomaly identification module 132 that includes any suitable machine learning algorithm/model 132M that is trained using the historical relationships 145. The anomaly identification module 132 is configured to compare the relationships 140 with the historical relationships 145 so as to detect any anomalies in one or more of, for example, the first and second times series of data 123TS, 125TS. As an example, referring to FIG. 8A, based on training of the anomaly identification module 132 the fault detection system 199 learned that under normal component operation the slope $M_x$ of the second time series of data 125TS for the second component parameter 125 should be different before and after the mode change 411 (e.g., the slope should be positive before the mode change 411 and negative after the mode change 411). FIG. 8B illustrates an example, where the performance of the second component parameter 125 has degraded such that the second time series of data 125TS for the second component parameter 125 has a positive slope $M_x$ before and after the mode change 411. This anomaly (e.g., the positive slope of the second time series of data 125TS before and after the mode change 411) is identified by the anomaly identification module 132 as an impending fault and may be presented by the user interface 175 to an operator as an indication of anomalies 177. In one aspect, the indication of anomalies 177 may be included in the post excursion (flight) vehicle maintenance report 176.

The vehicle control module is configured to predict a failure of a vehicle system 110 component corresponding to one or more of the plurality of component parameters 460 based on the anomalies in the respective time series of data. For example, based on the training of the anomaly detection module, it may be known how long degraded performance of a vehicle system 110 component may persist before a fault occurs with the vehicle system 110 component. For example, when the degraded performance of the second component parameter 125, as illustrated in FIG. 8B persists or increases the anomaly identification module 132 is configured to determine a failure time frame during which the second component 111B may fail. This failure time frame may be presented on the user interface 175 to an operator as a prediction of fault 178. In one aspect, the prediction of fault 178 may be included in the post excursion (flight) vehicle maintenance report 176.

In one aspect, the vehicle control module 120 is configured to cause the user interface to graphically present to the operator one or more of the one or more relationships between the plurality of component parameters 460 (as shown in, e.g., the relationship output 700 of FIG. 7 or any other suitable presentation format), the indication of anomalies 177, and the prediction of fault 178. The indication of anomalies 177 and/or the prediction of fault 178 may be presented in a graphical form such as the time series of data graphs illustrated herein, as bar graphs, or in any other suitable presentation format. As such, one or more of the relationship output 700, the indication of anomalies 177, and the prediction of fault 178 includes groups of component parameters that are related following a control signal change and the expected behavior of the effected parameters. The operator (which may be maintenance personnel) may perform any suitable preventative maintenance (FIG. 9A, Block 940) based on the information provided in the indication of anomalies 177, and the prediction of fault 178, and/or the post excursion (flight) vehicle maintenance report 176. In one aspect, the vehicle fault detection system 199, such as through the vehicle control module 120, is configured to provide the operator with preventative maintenance corrective action(s) 179 (e.g., such as to replace a component in a vehicle system, secure a fastener in a vehicle system, etc.) in the post excursion vehicle maintenance report 176. The post vehicle excursion maintenance report 176 may be generated automatically by the vehicle control module 120 after an excursion, may be generated by the vehicle control module 120 in response to a detection of an anomaly by the vehicle fault detection system 199 and/or at the request of an operator/maintenance personnel of the vehicle. In other aspects, the vehicle fault detection system 199, such as through the vehicle control module 120 and/or interlock 197 described below, is configured to "lock out" a component of a vehicle system or the entire vehicle system in response to a detection of an anomaly. A vehicle system lock out indication 174 may be provided with one or more of the indication of anomalies 177, the prediction of fault 178 and the corrective action 179.

Referring now to FIGS. 1 and 9A, an exemplary operation of the fault detection system will be described. In accordance with the aspects of the present disclosure, respective time series of data 123TS, 125TS are detected with the plurality of sensors 101 coupled to the vehicle system 110 (FIG. 9A, Block 910), where each time series of data 123TS, 125TS corresponds to a component parameter 123, 125 of a plurality of component parameters 460. The vehicle control module 120 is coupled to the plurality of sensors and determines an existence of one or more relationships between the plurality of component parameters 460 (FIG. 9A, Block 920) in the manner described above with respect to FIG. 9B. The vehicle control module 120 identifies anomalies in the respective time series of data 123TS, 125TS (FIG. 9A, Block 930) based on the one or more relationships between the plurality of component parameters 460. At least the indication of the anomalies 177 in the respective time series of data 123TS, 125TS is presented to an operator (FIG. 9A, Block 940) with the user interface 175 coupled to the vehicle control module 120.

Referring to FIG. 1, the vehicle control module 120 may perform the above-described fault detection and fault prediction analysis at vehicle 100 startup and/or prior to any suitable specified operation of the vehicle 100 (e.g., for example, dropping an anchor, docking with a space station, operating a robotic arm of the vehicle, etc.). In other aspects, the vehicle control module 120 may perform the above-described fault detection and fault prediction analysis at vehicle 100 shutdown. For example, the vehicle fault detection system 199 may include a vehicle interlock 197 coupled with the vehicle control module 120 and one or more of the vehicle systems 110. The vehicle interlock 197 is configured to prevent an operation (corresponding to a vehicle system 110 coupled to the interlock 197) of the vehicle 100 based on a detection of the anomalous behavior that is indicative of a component fault/failure. Here, if the vehicle control module 120 detects anomalous behavior of a vehicle system 110 component the vehicle interlock 197 may "lock out" the vehicle system component and/or vehicle system by preventing the operation of the vehicle system component/vehicle system or by providing a limited operational capability of the vehicle system component and/or vehicle system. For example, if anomalous behavior is detected for a robotic arm of a spacecraft (that includes the fault detection system 199 described herein) the vehicle interlock 197 may prevent the operation of the robotic arm to allow for the performance of preventative maintenance. In other aspects, as noted above, the vehicle interlock 197 may be configured to provide limited/restricted use of the vehicle component/system when anomalous behavior of the vehicle system 110 component is detected by the vehicle fault detection system 199. The vehicle interlock 197 is configured to communicate with the vehicle control module 120 so that the vehicle system lockout indication 174 is presented to the operator through the user interface 175 to indicate which vehicle component and/or system is being locked out.

Referring to FIGS. 10 and 11, examples of the present disclosure may be described in the context of aircraft manufacturing and service method 1100 as shown in FIG. 11. In other aspects, the examples of the present disclosure may be applied in any suitable industry, such as e.g., automotive, maritime, aerospace, etc. as noted above. With respect to aircraft manufacturing, during pre-production, illustrative method 1100 may include specification and design (block 1110) of aircraft 100A and material procurement (block 1120). During production, component and subassembly manufacturing (block 1130) and system integration (block 1140) of aircraft 100A may take place. Thereafter, aircraft 100A may go through certification and delivery (block 1150) to be placed in service (block 1160). While in service, aircraft 100A may be scheduled for routine maintenance and service (block 1170). Routine maintenance and service may include modification, reconfiguration, refurbishment, etc. of one or more systems of aircraft 100A which may include and/or be facilitated by the fault determination described herein.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

The apparatus(es), system(s), and method(s) shown or described herein may be employed during any one or more of the stages of the manufacturing and service method 1100. For example, components or subassemblies corresponding to component and subassembly manufacturing (block 1130) may be fabricated or manufactured in a manner similar to components or subassemblies produced while aircraft 100A is in service (block 1160). Similarly, one or more examples of the apparatus or method realizations, or a combination thereof, may be utilized, for example and without limitation, while aircraft 100A is in service (block 1160) and/or during maintenance and service (block 1170).

The following are provided in accordance with the aspects of the present disclosure:

A1. A vehicle fault detection system comprising:
a first sensor coupled to a vehicle system and configured to detect a first time series of data of a first component parameter;
a second sensor coupled to the vehicle system and configured to detect a second time series of data of a second component parameter;
a vehicle control module coupled to the first sensor and the second sensor, the vehicle control module being configured to
determine an existence of a relationship between the first component parameter and the second component parameter, and
identify anomalies in the one or more of the first time series of data and the second time series of data based on the relationship between the first component parameter and the second component parameter; and
a user interface coupled to the vehicle control module, the user interface being configured to present to an operator an indication of the anomalies in the one or more of the first time series of data and the second time series of data.

A2. The vehicle fault detection system of paragraph A1, wherein the vehicle control module is configured to predict a failure of a vehicle system component corresponding to one or more of the first component parameter and the second component parameter based on the anomalies in the one or more of the first time series of data and the second time series of data, and the user interface is configured to present to the operator prediction of the failure of the vehicle system component.

A3. The vehicle fault detection system of paragraph A1, wherein the user interface is configured to graphically present to the operator the relationship between the first component parameter and the second component parameter.

A4. The vehicle fault detection system of paragraph A1, wherein the vehicle control module is configured to classify each of the first component parameter and the second component parameter as being one of categorical or continuous.

A5. The vehicle fault detection system of paragraph A1, wherein the vehicle control module is configured to determine the existence of the relationship between the first component parameter and the second component parameter by determining any effects on one of the first component parameter and the second component parameter caused by another of the first component parameter and the second component parameter.

A6. The vehicle fault detection system of paragraph A5, wherein the vehicle control module is configured to:
identify mode change events within one or more of the first time series of data and the second time series of data based on a vehicle system control signal; and
determine any effects on one of the first component parameter and the second component parameter caused by another of the first component parameter and the second component parameter by comparing a predetermined characteristic of one or more of the first time series of data and the second time series of data before and after the mode change events.

A7. The vehicle fault detection system of paragraph A6, wherein a mode change event is one of an increase in value or a decrease in value of a respective one of the first time series of data and the second time series of data.

A8. The vehicle fault detection system of paragraph A6, wherein the predetermined characteristic is the coefficient of determination of one or more of the first time series of data and the second time series across the mode change events.

A9. The vehicle fault detection system of paragraph A5, wherein the vehicle control module is configured to determine a correlation between the first component parameter and the second component parameter before and after the mode change events.

A10. The vehicle fault detection system of paragraph A9, wherein:

where the one of the first component parameter and the second component parameter is categorized as continuous, the vehicle control module is configured to determine a change in slope of a respective one of the first time series of data and the second time series of data across the mode change events; and where the one of the first component parameter and the second component parameter is categorized as categorical or continuous, the vehicle control module is configured to determine a change in magnitude of a respective one of the first time series of data and the second time series of data across the mode change events.

A11. The vehicle fault detection system of paragraph A1, wherein the vehicle control module is configured to:

score the relationship; and average the score over multiple excursions of the vehicle.

A12. The vehicle fault detection system of paragraph A11, wherein each excursion is an individual flight of the vehicle.

A13. The vehicle fault detection system of paragraph A1, wherein the user interface is configured to present the indication of the anomalies and a failure prediction based on the anomalies in a post-flight vehicle maintenance report.

A14. The vehicle fault detection system of paragraph A1, wherein the vehicle control module is configured to identify the anomalies by:

receiving a first historical time series of data for the first component parameter, where the first historical time series of data includes first component data that is labeled as corresponding to one or more of normal first component operation and anomalous first component operation;

receiving a second historical time series of data for the second component parameter, where the second historical time series of data includes second component data that is labeled as corresponding to one or more of normal second component operation and anomalous second component operation;

determining an existence of a historical relationship between the first component parameter and the second component parameter; and comparing the relationship between the first component parameter and the second component parameter with the historical relationship.

A15. The vehicle fault detection system of paragraph A1, further comprising a vehicle interlock coupled with the vehicle control module, the vehicle interlock being configured to prevent an operation of the vehicle based on a detection of the anomalous behavior.

B1. A vehicle fault detection system comprising:

a plurality of sensors coupled to a vehicle system and configured to detect respective time series of data, each time series of data corresponding to a component parameter of a plurality of component parameters;

a vehicle control module coupled to the plurality of sensors, the vehicle control module being configured to determine an existence of one or more relationships between the plurality of component parameters, and identify anomalies in the respective time series of data based on the one or more relationships between the plurality of component parameters; and a user interface coupled to the vehicle control module, the user interface being configured to present to an operator an indication of the anomalies in the respective time series of data.

B2. The vehicle fault detection system of paragraph B1, wherein the vehicle control module is configured to predict a failure of a vehicle system component corresponding to one or more of the plurality of component parameters based on the anomalies in the respective time series of data, and the user interface is configured to present to the operator prediction of the failure of the vehicle system component.

B3. The vehicle fault detection system of paragraph B1, wherein the user interface is configured to graphically present to the operator the one or more relationships between the plurality of component parameters.

B4. The vehicle fault detection system of paragraph B1, wherein the vehicle control module is configured to classify each of the plurality of component parameters as being one of categorical or continuous.

B5. The vehicle fault detection system of paragraph B1, wherein the vehicle control module is configured to determine the existence of the one or more relationships between the plurality of component parameters by determining any effects on one of the plurality of component parameters caused by another of the plurality of component parameters.

B6. The vehicle fault detection system of paragraph B5, wherein the vehicle control module is configured to:

identify mode change events within one or more of the respective time series of data based on a vehicle system control signal; and determine any effects on one of the plurality of component parameters caused by another of the plurality of component parameters by comparing a predetermined characteristic of one or more of the respective time series of data before and after the mode change events.

B7. The vehicle fault detection system of paragraph B6, wherein a mode change event is one of an increase in value or a decrease in value of the respective time series of data.

B8. The vehicle fault detection system of paragraph B6, wherein the predetermined characteristic is the coefficient of determination of one or more of the respective time series of data across the mode change events.

B9. The vehicle fault detection system of paragraph B5, wherein the vehicle control module is configured to determine a correlation between the plurality of component parameters before and after the mode change events.

B10. The vehicle fault detection system of paragraph B9, wherein:

where the component parameter is categorized as continuous, the vehicle control module is configured to determine a change in slope of the respective time series of data across the mode change events; and where the component parameter is categorized as categorical or continuous, the vehicle control module is configured to determine a change in magnitude of the respective time series of data across the mode change events.

B11. The vehicle fault detection system of paragraph B1, wherein the vehicle control module is configured to:

score the one or more relationships; and average the score over multiple excursions of the vehicle.

B12. The vehicle fault detection system of paragraph B11, wherein each excursion is an individual flight of the vehicle.

B13. The vehicle fault detection system of paragraph B1, wherein the user interface is configured to present the indication of the anomalies and a failure prediction based on the anomalies in a post-flight vehicle maintenance report.

B14. The vehicle fault detection system of paragraph B1, wherein the vehicle control module is configured to identify the anomalies by:

receiving respective historical time series of data for the plurality of component parameters, where each of the respective historical time series of data includes respective component data that is labeled as corresponding to one or more of normal component operation and anomalous component operation;

determining an existence of one or more historical relationships between the plurality of component parameters; and comparing the one or more relationships between the plurality of component parameters with the one or more historical relationships.

B15. The vehicle fault detection system of paragraph A1, further comprising a vehicle interlock coupled with the vehicle control module, the vehicle interlock being configured to prevent an operation of the vehicle based on a detection of the anomalous behavior.

C1. A method for vehicle fault detection, the method comprising:

detecting, with a plurality of sensors coupled to a vehicle system, respective time series of data, each time series of data corresponding to a component parameter of a plurality of component parameters;

determining, with a vehicle control module coupled to the plurality of sensors, an existence of one or more relationships between the plurality of component parameters;

identifying, with the vehicle control module, anomalies in the respective time series of data based on the one or more relationships between the plurality of component parameters; and presenting to an operator, with a user interface coupled to the vehicle control module, an indication of the anomalies in the respective time series of data.

C2. The method of paragraph C1, further comprising:

predicting, with the vehicle control module, a failure of a vehicle system component corresponding to one or more of the plurality of component parameters based on the anomalies in the respective time series of data; and presenting to the operator, with the user interface, prediction of the failure of the vehicle system component.

C3. The method of paragraph C1, further comprising graphically presenting, to the operator, the one or more relationships between the plurality of component parameters.

C4. The method of paragraph C1, further comprising classifying, with the vehicle control module, each of the plurality of component parameters as being one of categorical or continuous.

C5. The method of paragraph C1, further comprising determining, with the vehicle control module, the existence of the one or more relationships between the plurality of component parameters by determining any effects on one of the plurality of component parameters caused by another of the plurality of component parameters.

C6. The method of paragraph C5, further comprising:

identifying, with the vehicle control module, mode change events within one or more of the respective time series of data based on a vehicle system control signal; and determining, with the vehicle control module, any effects on one of the plurality of component parameters caused by another of the plurality of component parameters by comparing a predetermined characteristic of one or more of the respective time series of data before and after the mode change events.

C7. The method of paragraph C6, wherein a mode change event is one of an increase in value or a decrease in value of the respective time series of data.

C8. The method of paragraph C6, wherein the predetermined characteristic is the coefficient of determination of one or more of the respective time series of data across the mode change events.

C9. The method of paragraph C5, further comprising determining, with the vehicle control module, a correlation between the plurality of component parameters before and after the mode change events.

C10. The method of paragraph C9, wherein:

where the component parameter is categorized as continuous, the vehicle control module determines a change in slope of the respective time series of data across the mode change events; and where the component parameter is categorized as categorical or continuous, the vehicle control module determines a change in magnitude of the respective time series of data across the mode change events.

C11. The method of paragraph C1, further comprising:

scoring, with the vehicle control module, the one or more relationships; and averaging, with the vehicle control module, the score over multiple excursions of the vehicle.

C12. The method of paragraph C11, wherein each excursion is an individual flight of the vehicle.

C13. The method of paragraph C1, wherein the indication of the anomalies and a failure prediction based on the anomalies is presented by the user interface in a post-flight vehicle maintenance report.

C14. The method of paragraph C1, wherein the vehicle control module identifies the anomalies by:

receiving respective historical time series of data for the plurality of component parameters, where each of the respective historical time series of data includes respective component data that is labeled as corresponding to one or more of normal component operation and anomalous component operation;

determining an existence of one or more historical relationships between the plurality of component parameters; and comparing the one or more relationships between the plurality of component parameters with the one or more historical relationships.

C15. The method of paragraph C1, further comprising preventing an operation of the vehicle, with a vehicle interlock coupled with the vehicle control module, based on a detection of the anomalous behavior.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 9A, 9B, and 11, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 9A, 9B, and 11, and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es), system(s), and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A vehicle fault detection system, comprising:
a vehicle control module coupled to a plurality of sensors wherein the plurality of sensors are coupled to a vehicle system and configured to detect respective time series of data, each time series of data corresponding to a component parameter of a plurality of component parameters, the vehicle control module being configured to
determine, based on domain knowledge obtained by the vehicle control module from only the respective time series of data, an existence of one or more relationships between the plurality of component parameters, wherein at least one mode change event within one or more of the respective time series of data are identified based on a vehicle system control signal, and
identify at least one anomaly in the respective time series of data and at least a vehicle component to be serviced based only on the domain knowledge and the one or more relationships between the plurality of component parameters; and
wherein an indication of the anomalies in the respective time series of data and an identification of the vehicle component to be serviced is presented on a user interface that is coupled to the vehicle control module.

2. The vehicle fault detection system of claim 1, wherein the vehicle control module is configured to predict a failure of a vehicle system component corresponding to one or more of the plurality of component parameters based on the anomalies in the respective time series of data, and wherein the user interface is configured to present prediction of the failure of the vehicle system component.

3. The vehicle fault detection system of claim 1, wherein the vehicle control module is configured to classify each of the plurality of component parameters as being one of categorical or continuous.

4. The vehicle fault detection system of claim 1, wherein the vehicle control module is configured to determine the existence of the one or more relationships between the plurality of component parameters based on determining an effect on one of the plurality of component parameters that has been caused by another of the plurality of component parameters.

5. The vehicle fault detection system of claim 4, wherein the vehicle control module is configured to
determine the effect based on comparing a predetermined characteristic of one or more of the respective time series of data before and after the mode change events.

6. The vehicle fault detection system of claim 1, wherein the vehicle control module is configured to:
score the one or more relationships; and
average the score over multiple excursions of the vehicle.

7. The vehicle fault detection system of claim 1, wherein the vehicle control module is configured to identify the anomalies by:
receiving respective historical time series of data for the plurality of component parameters, where each of the respective historical time series of data comprises respective component data that is labeled as corresponding to one or more of normal component operation and anomalous component operation;
determining an existence of one or more historical relationships between the plurality of component parameters; and
comparing the one or more relationships between the plurality of component parameters with the one or more historical relationships.

8. A vehicle fault detection system comprising:
a first sensor coupled to a vehicle system and configured to detect a first time series of data of a first component parameter;
a second sensor coupled to the vehicle system and configured to detect a second time series of data of a second component parameter;
a vehicle control module coupled to the first sensor and the second sensor, the vehicle control module being configured to
determine, based on domain knowledge obtained by the vehicle control module from only the first time series of data and the second time series of data, an existence of a relationship between the first component parameter and the second component parameter wherein at least one mode change event within one or more of the first time series of data and the second time series of data are identified based on a vehicle system control signal, and
identify at least one anomaly in the one or more of the first time series of data and the second time series of data and at least a vehicle component to be serviced based only on the domain knowledge and the relationship between the first component parameter and the second component parameter; and
a user interface coupled to the vehicle control module, the user interface being configured to present an indication of the anomalies in the one or more of the first time series of data and the second time series of data and identify the vehicle component to be serviced.

9. The vehicle fault detection system of claim 8, wherein the vehicle control module is configured to determine the existence of the relationship between the first component parameter and the second component parameter based on determining an effect on one of the first component parameter and the second component parameter that has been caused by another of the first component parameter and the second component parameter.

10. The vehicle fault detection system of claim 9, wherein the vehicle control module is configured to
determine the effect based on comparing a predetermined characteristic of one or more of the first time series of data and the second time series of data before and after the mode change events.

11. The vehicle fault detection system of claim 10, wherein a mode change event is one of an increase in value or a decrease in value of a respective one of the first time series of data and the second time series of data.

12. The vehicle fault detection system of claim 10, wherein the predetermined characteristic is a coefficient of determination of one or more of the first time series of data and the second time series across the mode change events.

13. The vehicle fault detection system of claim 9, wherein the vehicle control module is configured to determine a correlation between the first component parameter and the second component parameter before and after the mode change events.

14. The vehicle fault detection system of claim 13, wherein:
where the one of the first component parameter and the second component parameter is categorized as continuous, the vehicle control module is configured to determine a change in slope of a respective one of the first time series of data and the second time series of data across the mode change events; and
where the one of the first component parameter and the second component parameter is categorized as categorical or continuous, the vehicle control module is configured to determine a change in magnitude of a respective one of the first time series of data and the second time series of data across the mode change events.

15. A method for vehicle fault detection, the method comprising:
receiving from a plurality of sensors coupled to a vehicle system, respective time series of data, each time series of data corresponding to a component parameter of a plurality of component parameters;
determining, with a vehicle control module coupled to the plurality of sensors and based on domain knowledge obtained by the vehicle control module from only the respective time series of data, an existence of one or more relationships between the plurality of component parameters where at least one mode change event within one or more of the first time series of data and the second time series of data are identified based on a vehicle system control signal;
identifying, with the vehicle control module, at least one anomaly in the respective time series of data and at least a vehicle component to be serviced based only on the domain knowledge and the one or more relationships between the plurality of component parameters; and facilitating a presentation of an indication of the anomalies in the respective time series of data and an indication of at least a vehicle component to be serviced via a user interface coupled to the vehicle control module.

16. The method of claim 15, further comprising classifying, with the vehicle control module, each of the plurality of component parameters as being one of categorical or continuous.

17. The method of claim 15, further comprising determining, with the vehicle control module, the existence of the one or more relationships between the plurality of component parameters based on determining an effect on one of the plurality of component parameters that has been caused by another of the plurality of component parameters.

18. The method of claim 17, further comprising determining the effect based on comparing a predetermined characteristic of one or more of the respective time series of data before and after the mode change events.

19. The method of claim 15, further comprising:
scoring, with the vehicle control module, the one or more relationships; and
averaging, with the vehicle control module, the score over multiple excursions of the vehicle.

20. The method of claim 15, wherein the vehicle control module identifies the anomalies by:
receiving respective historical time series of data for the plurality of component parameters, where each of the respective historical time series of data comprises respective component data that is labeled as corresponding to one or more of normal component operation and anomalous component operation;
determining an existence of one or more historical relationships between the plurality of component parameters; and
comparing the one or more relationships between the plurality of component parameters with the one or more historical relationships.

* * * * *